US012651455B2

(12) United States Patent
Richter

(10) Patent No.: US 12,651,455 B2
(45) Date of Patent: Jun. 9, 2026

(54) CAPTURING OBJECTS IN AN UNSTRUCTURED VIDEO STREAM

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 311 days.

(21) Appl. No.: 17/482,402

(22) Filed: Sep. 22, 2021

(65) Prior Publication Data

US 2022/0012283 A1     Jan. 13, 2022

Related U.S. Application Data

(63) Continuation of application No. PCT/US2020/030025, filed on Apr. 27, 2020.
(Continued)

(51) Int. Cl.
*G06V 20/20* (2022.01)
*G06F 16/75* (2019.01)
(Continued)

(52) U.S. Cl.
CPC .............. *G06V 20/20* (2022.01); *G06F 16/75* (2019.01); *G06F 16/7837* (2019.01);
(Continued)

(58) Field of Classification Search
CPC ........ G06V 20/20; G06V 10/25; G06V 10/17; G06V 20/46; G06V 10/82; G06T 7/11;
(Continued)

(56) References Cited

U.S. PATENT DOCUMENTS

| | | | |
|---|---|---|---|
| 10,042,048 B1 * | 8/2018 | Moya | G01S 13/9023 |
| 2014/0101691 A1 * | 4/2014 | Sinha | H04N 21/235 |
| | | | 725/32 |

(Continued)

FOREIGN PATENT DOCUMENTS

CN     102509104 A   *   6/2012

OTHER PUBLICATIONS

PCT International Search Report and Written Opinion dated Aug. 11, 2020, International Application No. PCT/US2020/030025, pp. 1-12.
(Continued)

*Primary Examiner* — Wednel Cadeau
(74) *Attorney, Agent, or Firm* — Fernando & Partners, LLP

(57) ABSTRACT

A method includes obtaining a first unstructured video stream that provides pixel values for a plurality of pixels and corresponds to a portion of a second unstructured video stream being displayed on a second electronic device different from the first electronic device. Obtaining the first unstructured video stream includes obtaining pass-through image data including the portion of a second unstructured video stream. The method includes generating respective pixel characterization vectors for a first portion of the plurality of pixels. Generating each of the respective pixel characterization vectors includes determining a respective instance label value. The method includes identifying a first object within the first portion of the plurality of pixels associated with a particular instance label value. The method includes generating respective semantic label values corresponding to pixels associated with the first object. The respective semantic label values are added to pixel characterization vectors associated with the first object.

18 Claims, 32 Drawing Sheets

Related U.S. Application Data

(60) Provisional application No. 62/840,263, filed on Apr. 29, 2019.

(51) Int. Cl.

| | |
|---|---|
| *G06F 16/78* | (2019.01) |
| *G06F 16/783* | (2019.01) |
| *G06T 7/11* | (2017.01) |
| *G06V 10/10* | (2022.01) |
| *G06V 10/25* | (2022.01) |
| *G06V 10/82* | (2022.01) |
| *G06V 20/40* | (2022.01) |

(52) U.S. Cl.
CPC ............ *G06F 16/7867* (2019.01); *G06T 7/11* (2017.01); *G06V 10/17* (2022.01); *G06V 10/25* (2022.01); *G06V 10/82* (2022.01); *G06V 20/46* (2022.01)

(58) Field of Classification Search
CPC ... G06F 16/75; G06F 16/7837; G06F 16/7867
See application file for complete search history.

(56) References Cited

U.S. PATENT DOCUMENTS

| | | | |
|---|---|---|---|
| 2016/0140724 A1* | 5/2016 | Ji ............................ | G06T 7/194 |
| | | | 382/173 |
| 2020/0051337 A1* | 2/2020 | Reynolds ............... | G06T 11/60 |

OTHER PUBLICATIONS

Simon Bergweiler et al., "Foundations of Semantic Television Design of a Distributed and Gesture-Based Television System," International Journal on Advances in Intelligent Systems, vol. 8, No. 1 & 2, 2015, pp. 194-208.

Timothy Neate et al., "Cross-device media: a review of second screening and multi-device television," Personal and Ubiquitous Computing, vol. 21, No. 2, 2017, pp. 391-405.

Sergio Goldenberg, "Creating augmented and immersive television experiences using a semantic framework," Proceedings of the 1st international conference on Designing interactive user experiences for TV and video, 2008, pp. 45-48 (Abstract Submitted).

* cited by examiner

Portable
Multifunction
Device 100

700

Pixel characterization vector 710-1

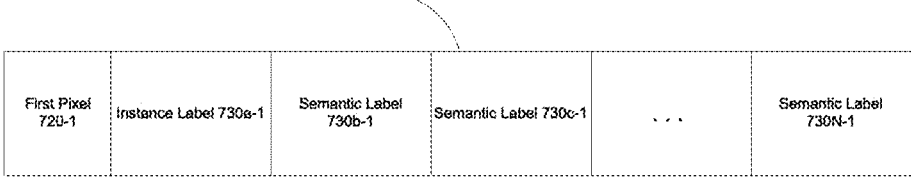

| First Pixel 720-1 | Instance Label 730a-1 | Semantic Label 730b-1 | Semantic Label 730c-1 | . . . | Semantic Label 730N-1 |

Pixel characterization vector 710-2

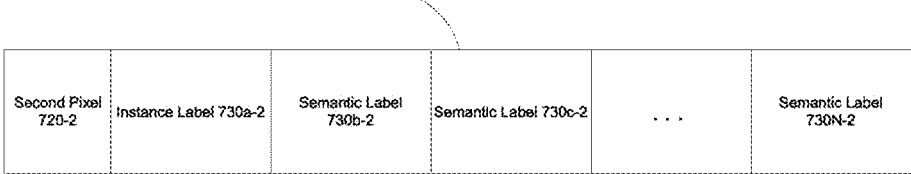

| Second Pixel 720-2 | Instance Label 730a-2 | Semantic Label 730b-2 | Semantic Label 730c-2 | . . . | Semantic Label 730N-2 |

Pixel characterization vector 710-3

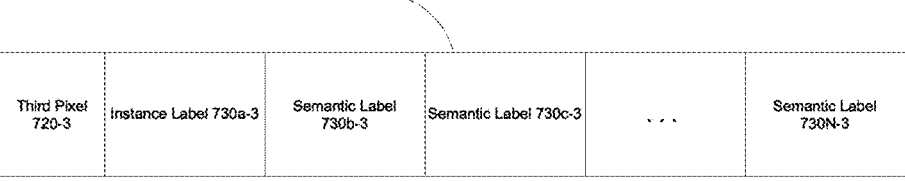

| Third Pixel 720-3 | Instance Label 730a-3 | Semantic Label 730b-3 | Semantic Label 730c-3 | . . . | Semantic Label 730N-3 |

•
•
•

Pixel characterization vector 710-M

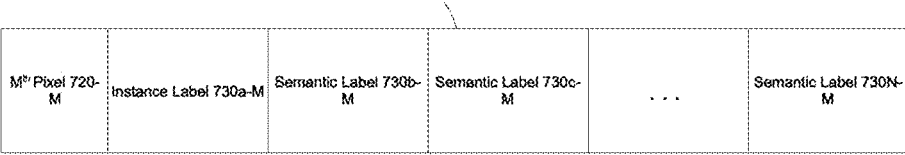

| M$^{th}$ Pixel 720-M | Instance Label 730a-M | Semantic Label 730b-M | Semantic Label 730c-M | . . . | Semantic Label 730N-M |

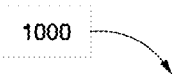
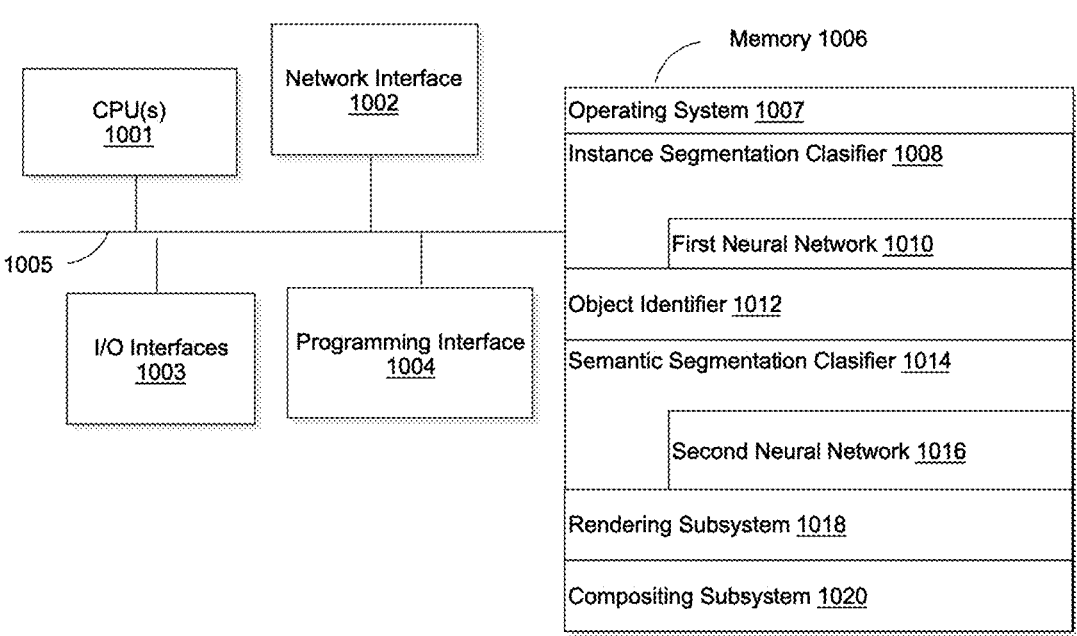
Memory 1006
CPU(s) 1001
Network Interface 1002
Operating System 1007
Instance Segmentation Clasifier 1008
First Neural Network 1010
Object Identifier 1012
Semantic Segmentation Clasifier 1014
Second Neural Network 1016
Rendering Subsystem 1018
Compositing Subsystem 1020
1005
I/O Interfaces 1003
Programming Interface 1004
Figure 10

CAPTURING OBJECTS IN AN UNSTRUCTURED VIDEO STREAM

CROSS-REFERENCE TO RELATED APPLICATIONS

This application is a continuation of Intl. Patent App. No. PCT/US2020/30025, filed on Apr. 27, 2020, which claims priority to U.S. Provisional Patent App. No. 62/840,263, filed on Apr. 29, 2019, all of which are hereby incorporated by reference in their entirety.

TECHNICAL FIELD

The present disclosure relates to capturing objects in an unstructured video stream, and, in particular, semantically identifying the objects in the unstructured video stream.

BACKGROUND

Generally, a video stream includes a sequence of images, each of which includes a number of pixels having corresponding values—for color, brightness, opacity, etc. From the perspective of a conventional system displaying a video stream, the video stream corresponds to a time-grouped collection (e.g. frames) of pixels with changing values. Accordingly, a conventional system processes and displays a video stream independent of a semantic understanding of content within the video stream, such as what objects, characters, and/or animals are being displayed.

Conventional video is or can be viewed as a highly commingled collection of "unstructured data," including human-understandable image representations of objects, characters, and/or animals (hereinafter, for the sake of brevity, "an object" refers to any one of one or more objects, characters, and/or animals). However, conventional video streams do not include a semantically labelled catalogue of the image representations of objects, which would be recognizable to human users. In turn, other machine systems with access to the conventional video stream are unable to identify, use, and/or manipulate representations of objects represented by mere pixel values within the image stream.

SUMMARY

In accordance with some implementations, a method is performed at a first electronic device with one or more image sensors, one or more processors, and a non-transitory memory. The method includes obtaining a first unstructured video stream that provides pixel values for a plurality of pixels. The first unstructured video stream corresponds to a portion of a second unstructured video stream being displayed on a secondary display of a second electronic device that is different from the first electronic device. Obtaining the first unstructured video stream includes obtaining, via the one or more image sensors, pass-through image data including the portion of a second unstructured video stream. The method further includes generating respective pixel characterization vectors for a first portion of the plurality of pixels. Generating each of the respective pixel characterization vectors includes determining a respective instance label value. The method further includes identifying a first object within the first portion of the plurality of pixels associated with a particular instance label value. The method further includes generating respective semantic label values corresponding to pixels associated with the first object. The respective semantic label values are added to pixel characterization vectors associated with the first object.

In accordance with some implementations, a first electronic device includes one or more image sensors, one or more processors, a non-transitory memory, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a first electronic device, cause the device to perform or cause performance of the operations of any of the methods described herein. In accordance with some implementations, a first electronic device includes means for performing or causing performance of the operations of any of the methods described herein. In accordance with some implementations, an information processing apparatus, for use in a first electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 7 is a representation of pixel characterization vectors according to some implementations.

FIG. 10 is a block diagram of an example of a first electronic device according to some implementations.

SUMMARY

Figure 1:
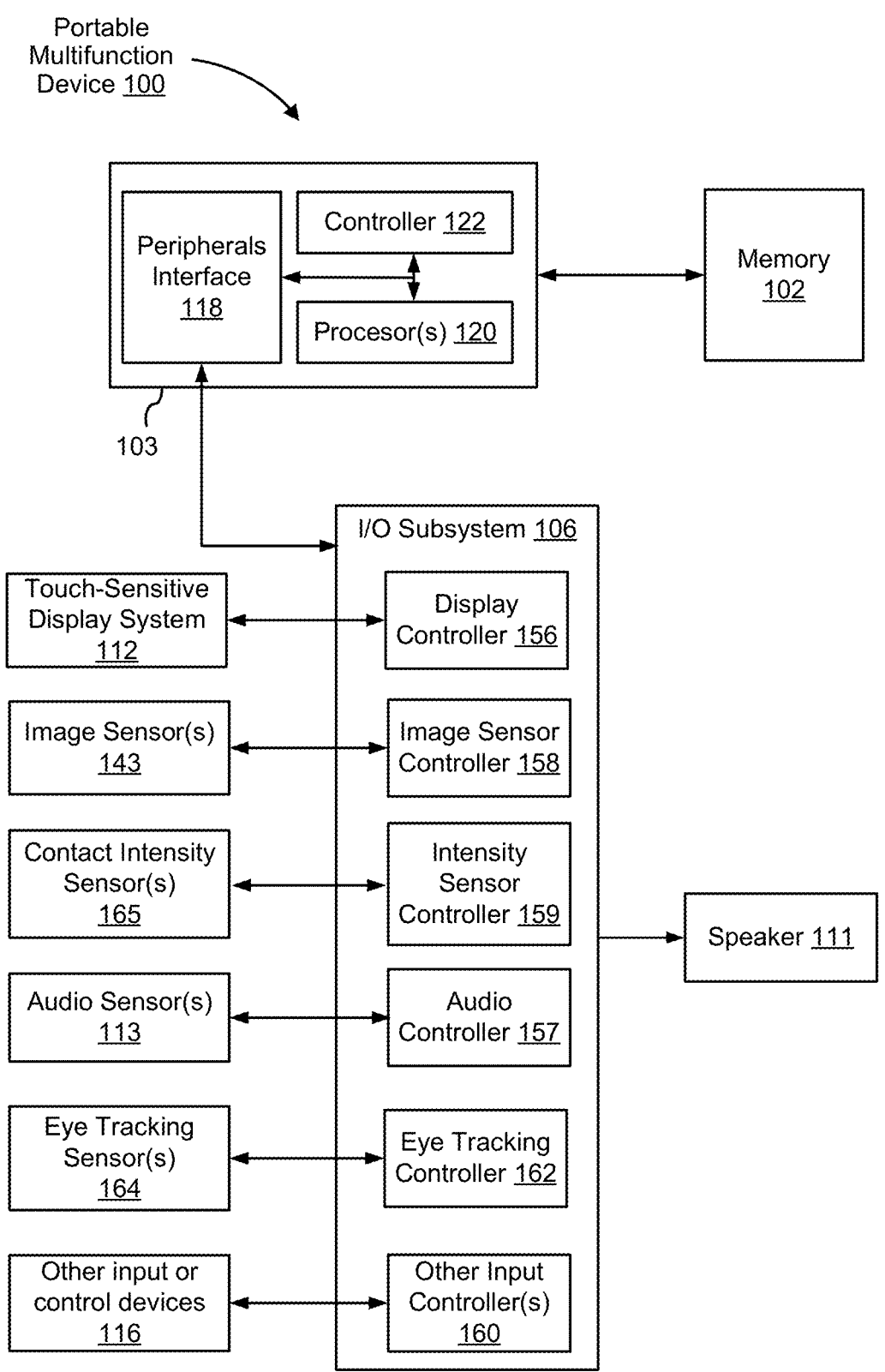
FIG. 1 is a block diagram of an example of a portable multifunction device in accordance with some implementations.

As represented by block 812, the method 800 includes identifying a first object within the portion of the plurality of pixels associated with a first instance label value. The first object may correspond to one or more of a feature, person(s), animal, etc. In some implementations, the first object corresponds to pixels that are adjacent to each other or contiguously associated with each other. For example, with reference to FIG. 2B, a pixel corresponding to the right eye of the dog 240 is adjacent to a pixel corresponding to the left eye of the dog 240. In some implementations, an object identifier (e.g., the object identifier 520 in FIG. 5) identifies the first object.

In various implementations, the first electronic device displays extended reality (XR) content related to a semantic feature within an unstructured video stream. In some implementations, the first electronic device displays the XR content overlaid on the unstructured video stream. For example, in some implementations, the first electronic device displays an objective-effectuator that is based on the semantic feature. As another example, in some implementations, the first electronic device displays informational XR content about the objects, characters, and/or animals.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina.

Projection systems also may be configured to project virtual objects into the physical environment, for example, as a hologram or on a physical surface.

FIG. 1 is a block diagram of an example of a portable multifunction device 100 (sometimes also referred to herein as the "first electronic device 100" for the sake of brevity) in accordance with some implementations. The first electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, image sensor(s) 143 (e.g., camera), contact intensity sensor(s) 165, audio sensor(s) 113 (e.g., microphone), eye tracking sensor(s) 164 (e.g., included within a head-mountable device (HMD)), and other input or control device(s) 116. In some implementations, the first electronic device 100 corresponds to one of a mobile phone, tablet, laptop, wearable computing device, head-mountable device (HMD), head-mountable enclosure (e.g. the first electronic device 100 slides into or otherwise attaches to a head-mountable enclosure), or the like. In some implementations, the head-mountable enclosure is shaped to form a receptacle for receiving the first electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the first electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button.

The touch-sensitive display system 112 provides an input interface and an output interface between the first electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the first electronic device 100 translates the rough finger-based input into a precise pointer/cursor position or command for performing the actions desired by the user.

The speaker 111 and the audio sensor(s) 113 provide an audio interface between a user and the first electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The image sensor(s) 143 capture still images and/or video. In some implementations, an image sensor 143 is located on the back of the first electronic device 100, opposite a touch screen on the front of the first electronic device 100, so that the touch screen is enabled for use as a viewfinder for still and/or video image acquisition. In some implementations, another image sensor 143 is located on the front of the first electronic device 100 so that the user's image is obtained (e.g., for selfies, for videoconferencing while the user views the other video conference participants on the touch screen, etc.). In some implementations, the image sensor(s) corresponds to one or more HMD cameras.

The contact intensity sensors 165 detect intensity of contacts on the first electronic device 100 (e.g., a touch input on a touch-sensitive surface of the first electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the first electronic device 100. In some implementations, at least one contact intensity sensor 165 is located on the back of the first electronic device 100.

The eye tracking sensor(s) 164 detect eye gaze of a user of the first electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

Figure 2A:
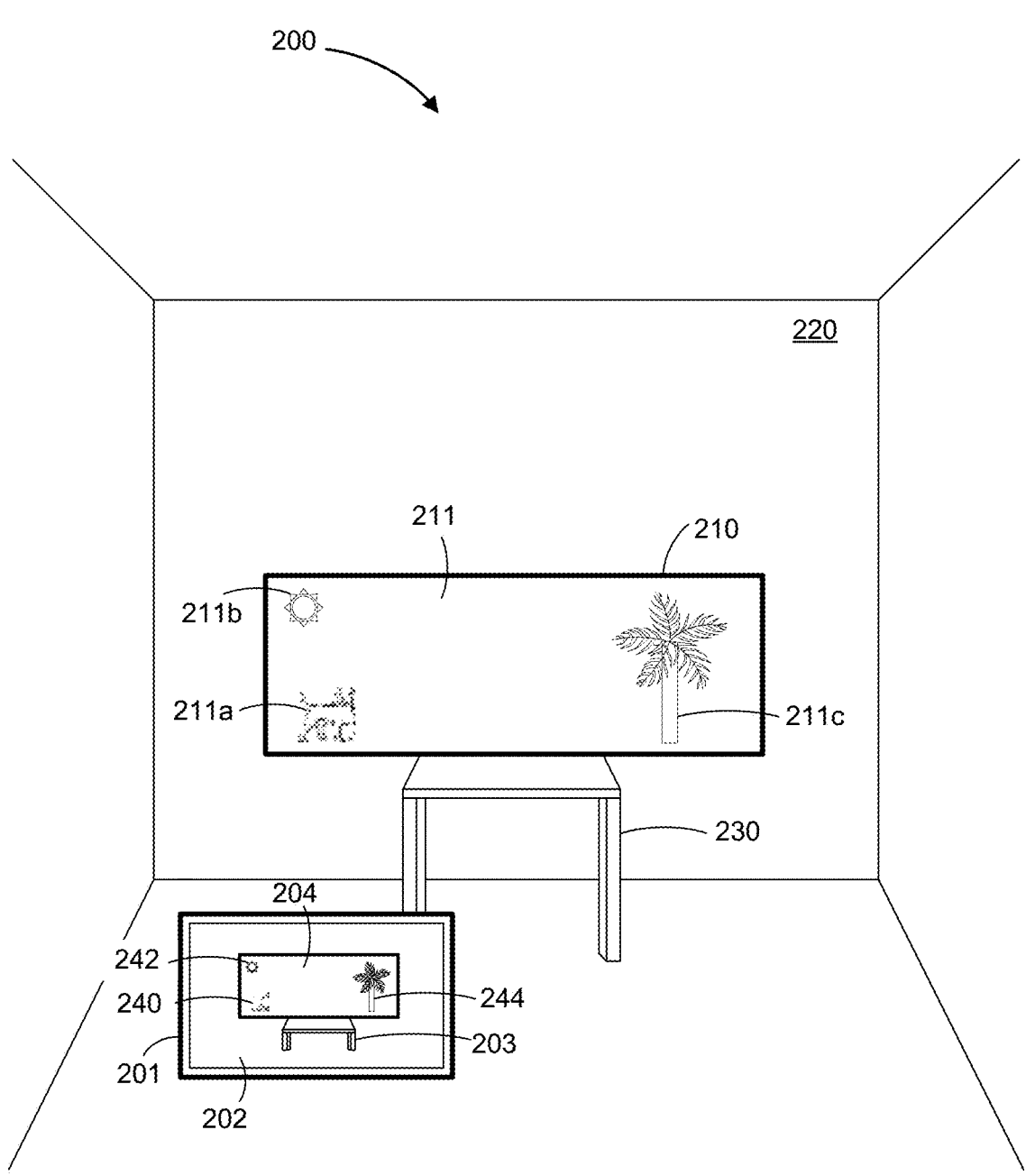
FIGS. 2A-2N are an example of a physical environment including a first electronic device displaying extended reality (XR) content corresponding to a semantically-identified object within an unstructured video stream being displayed on a second electronic device.
Figure 2B:
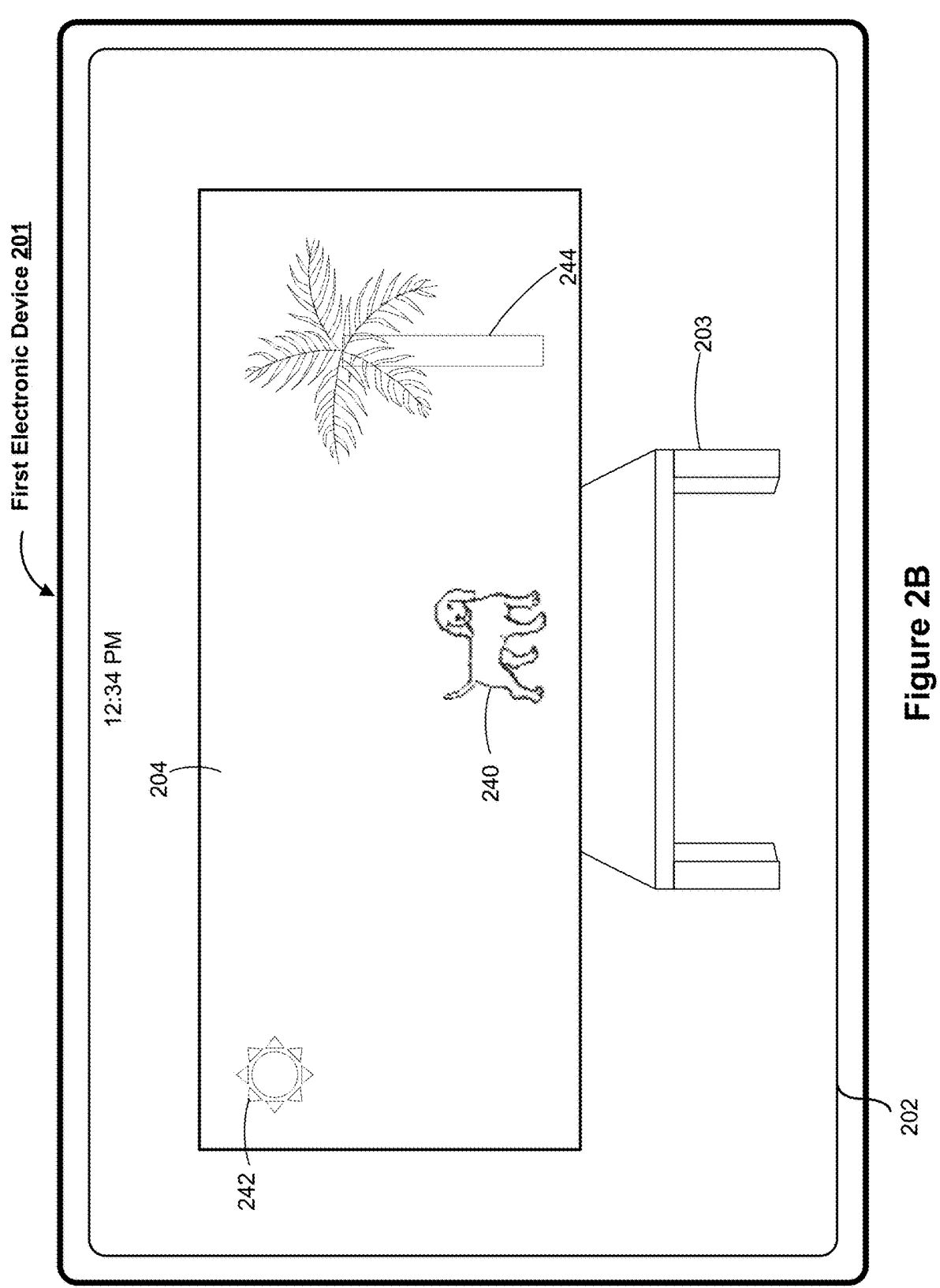
Figure 2C:
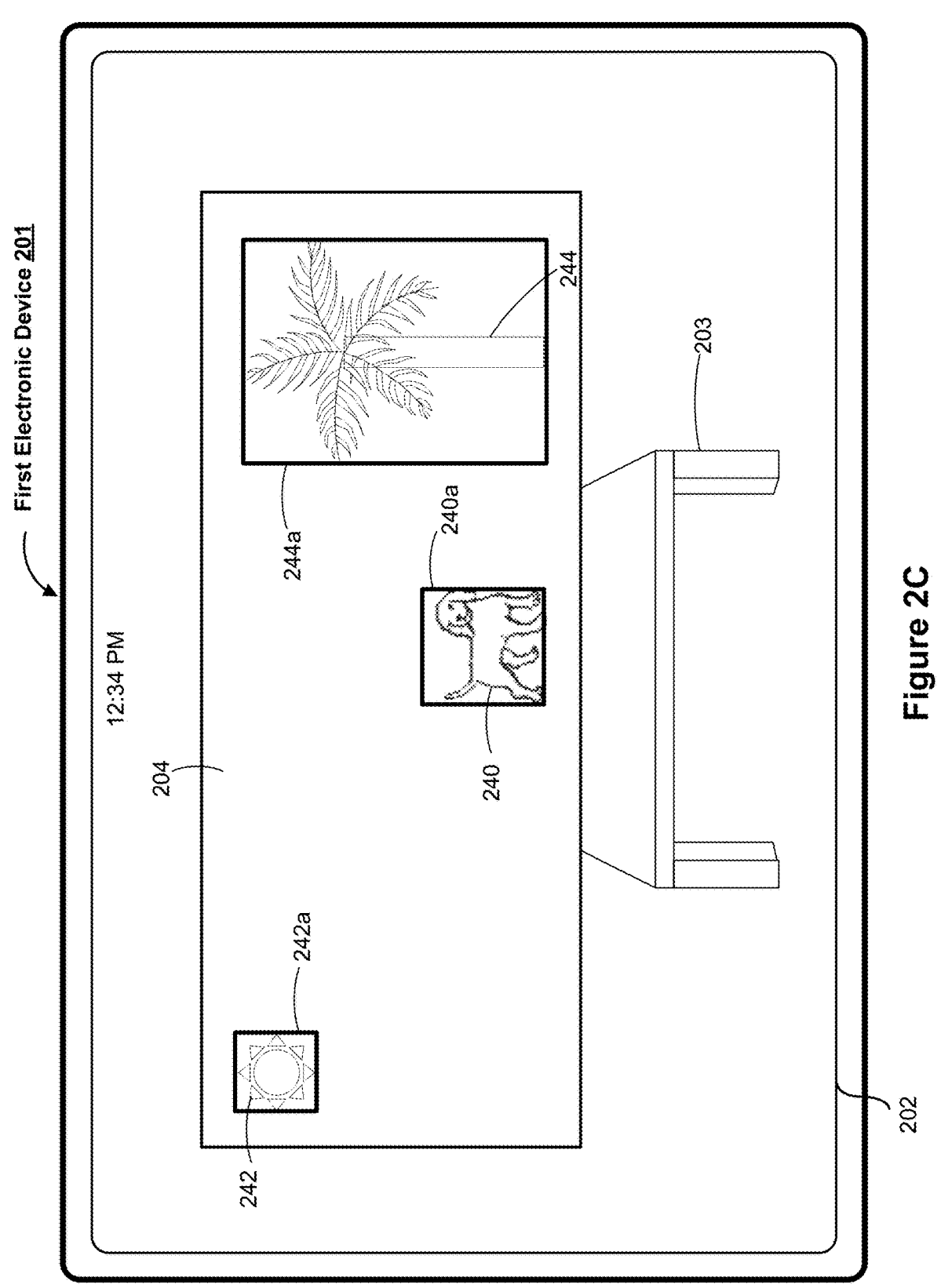
Figure 2D:
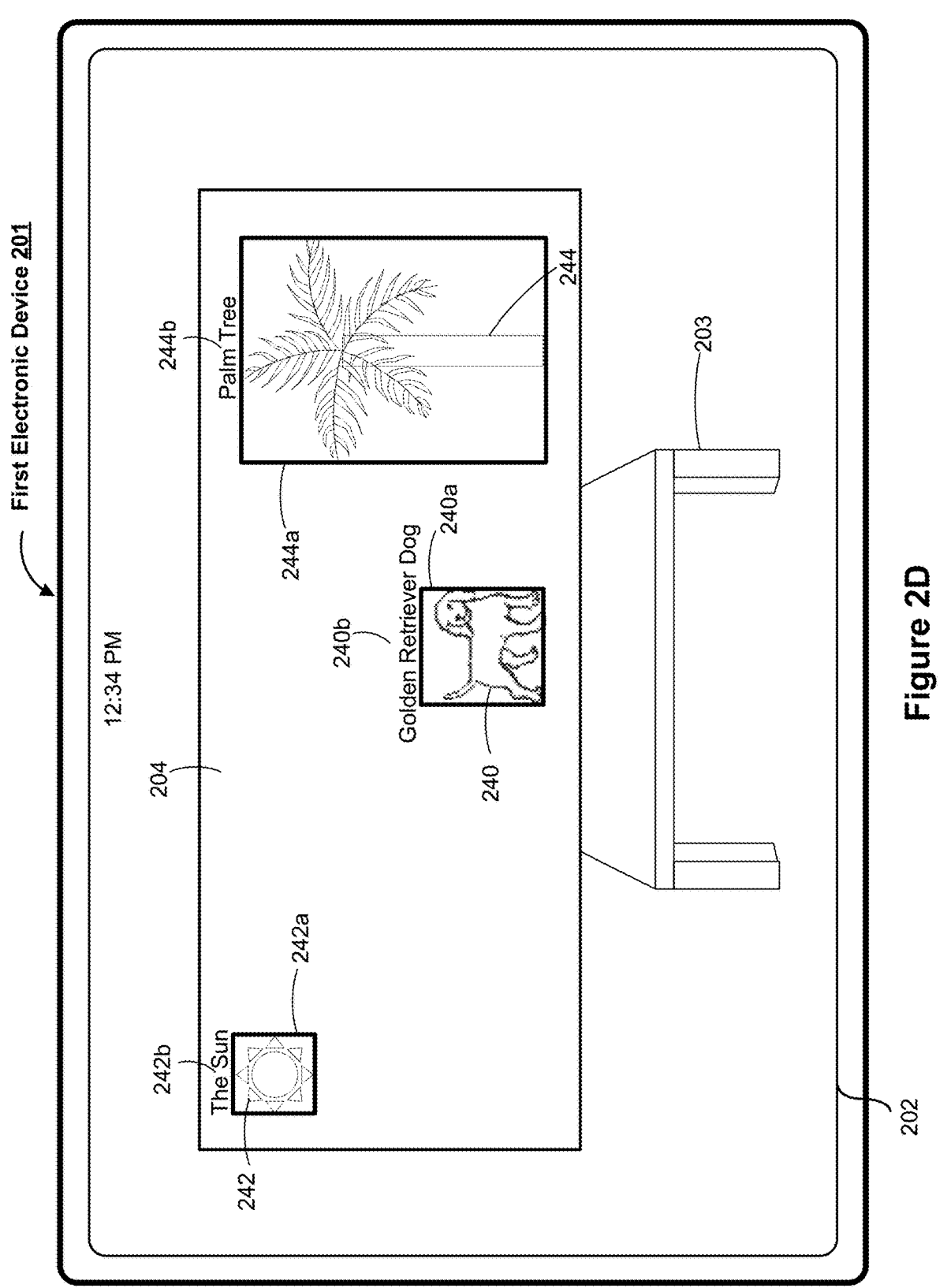
Figure 2E:
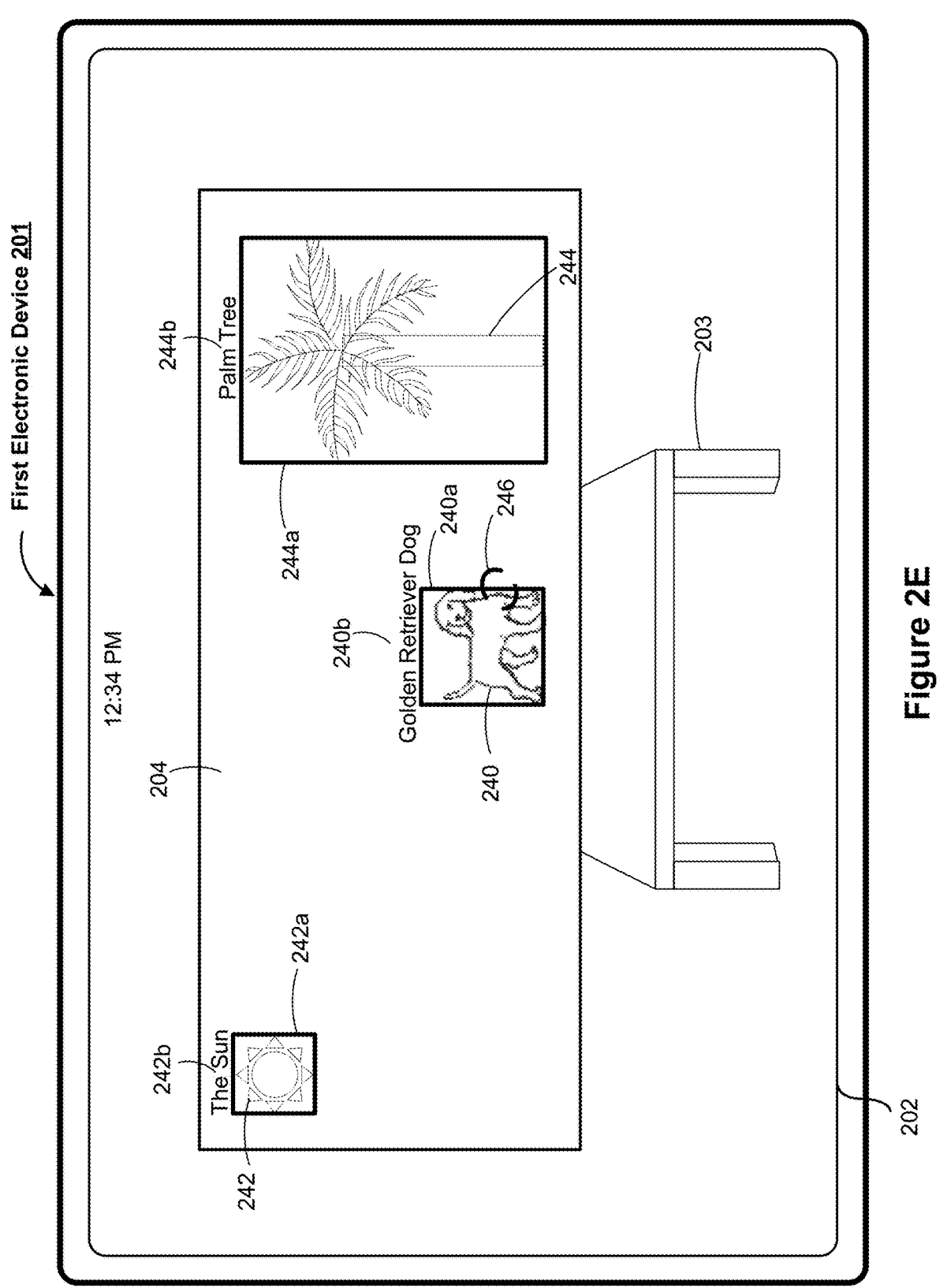
Figure 2F:
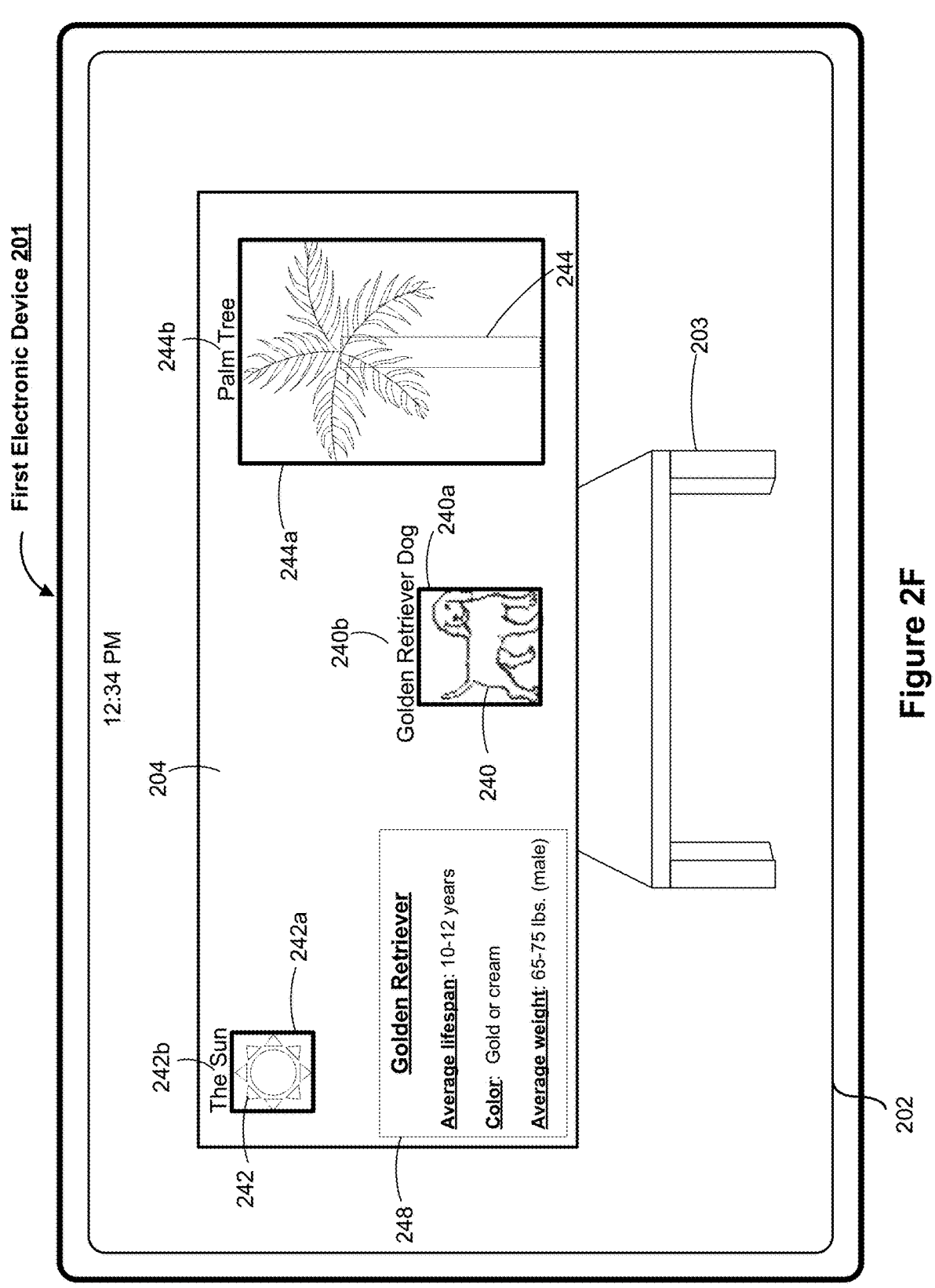
Figure 2G:
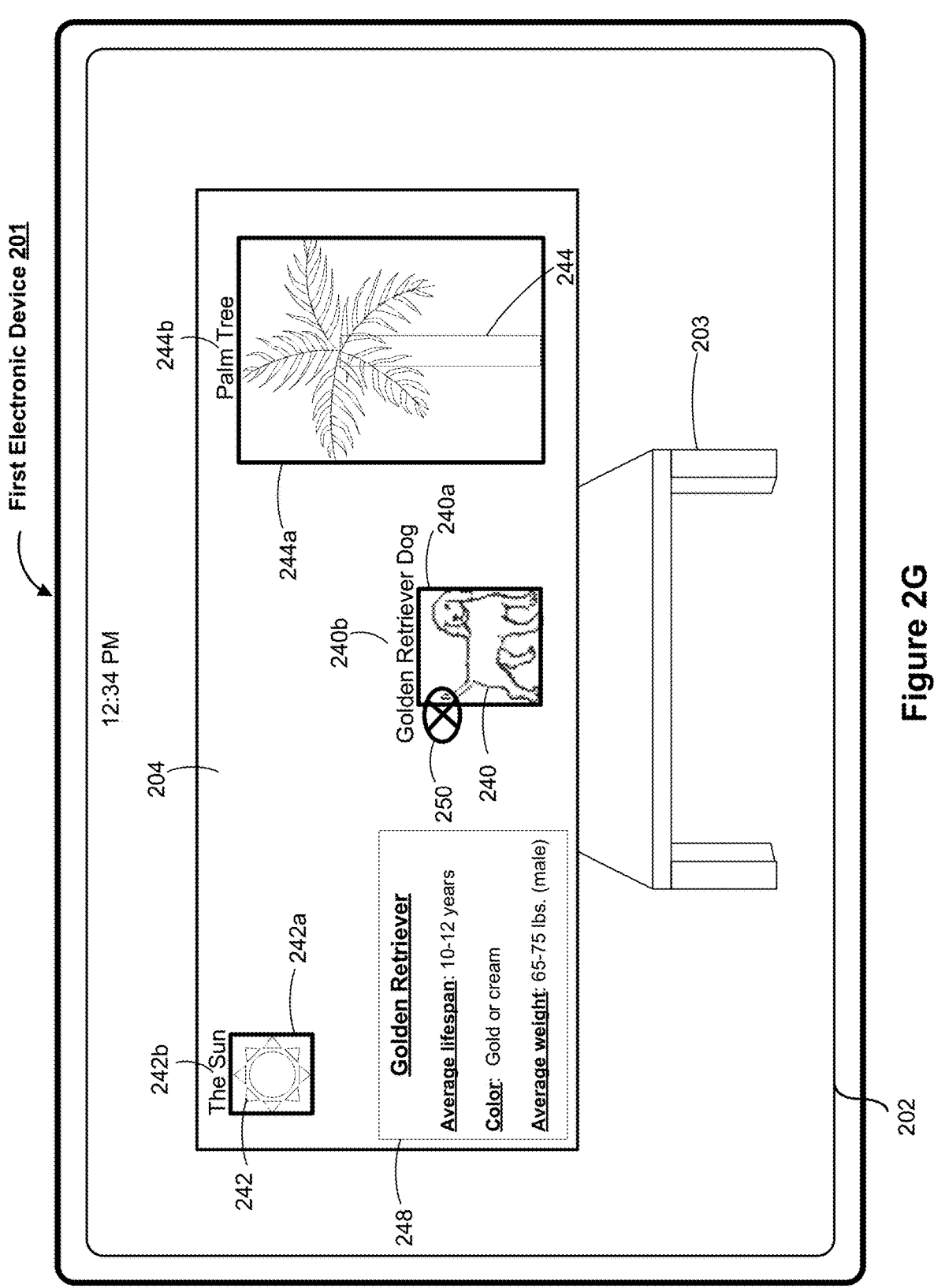
Figure 2H:
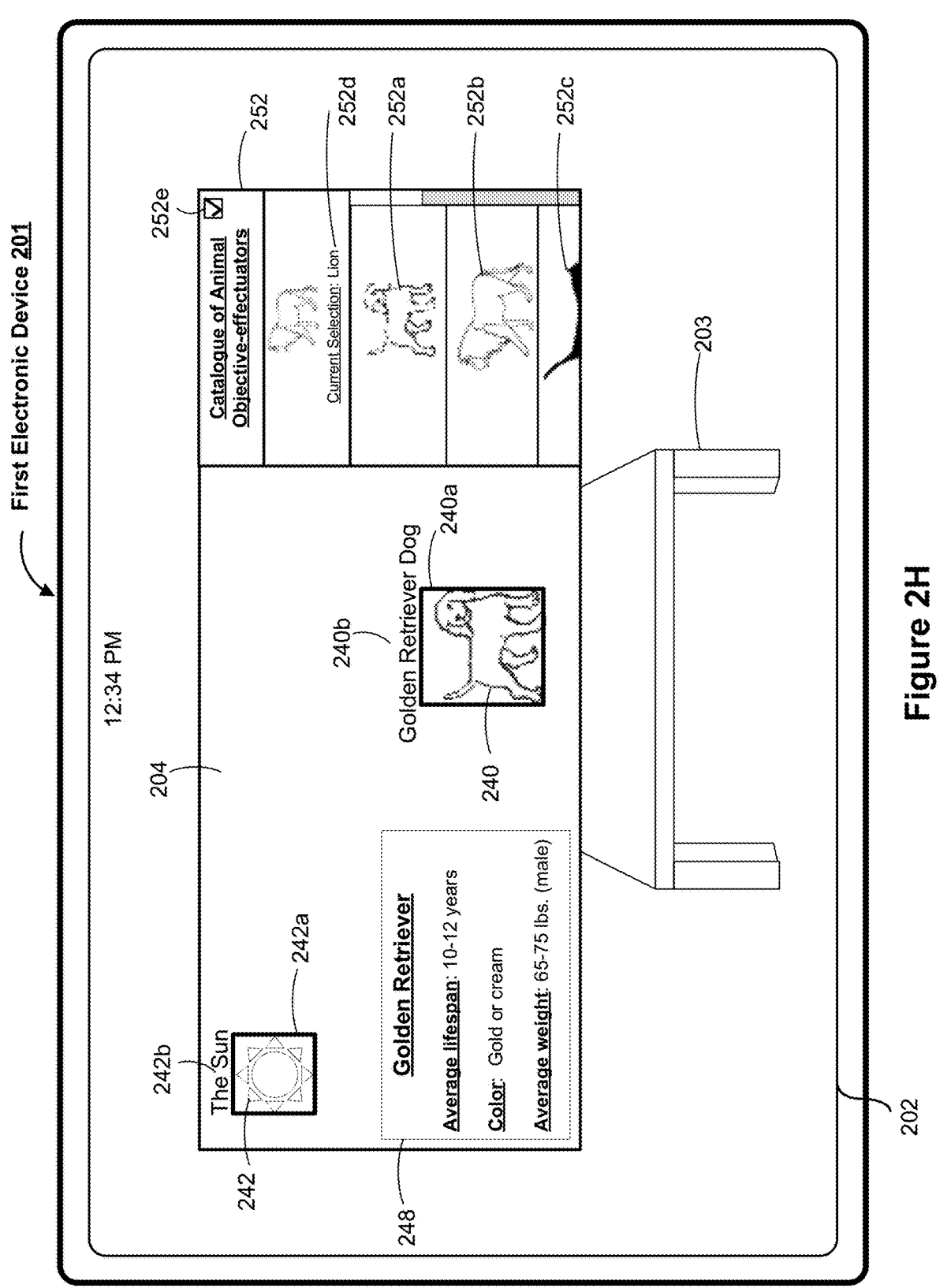
Figure 2I:
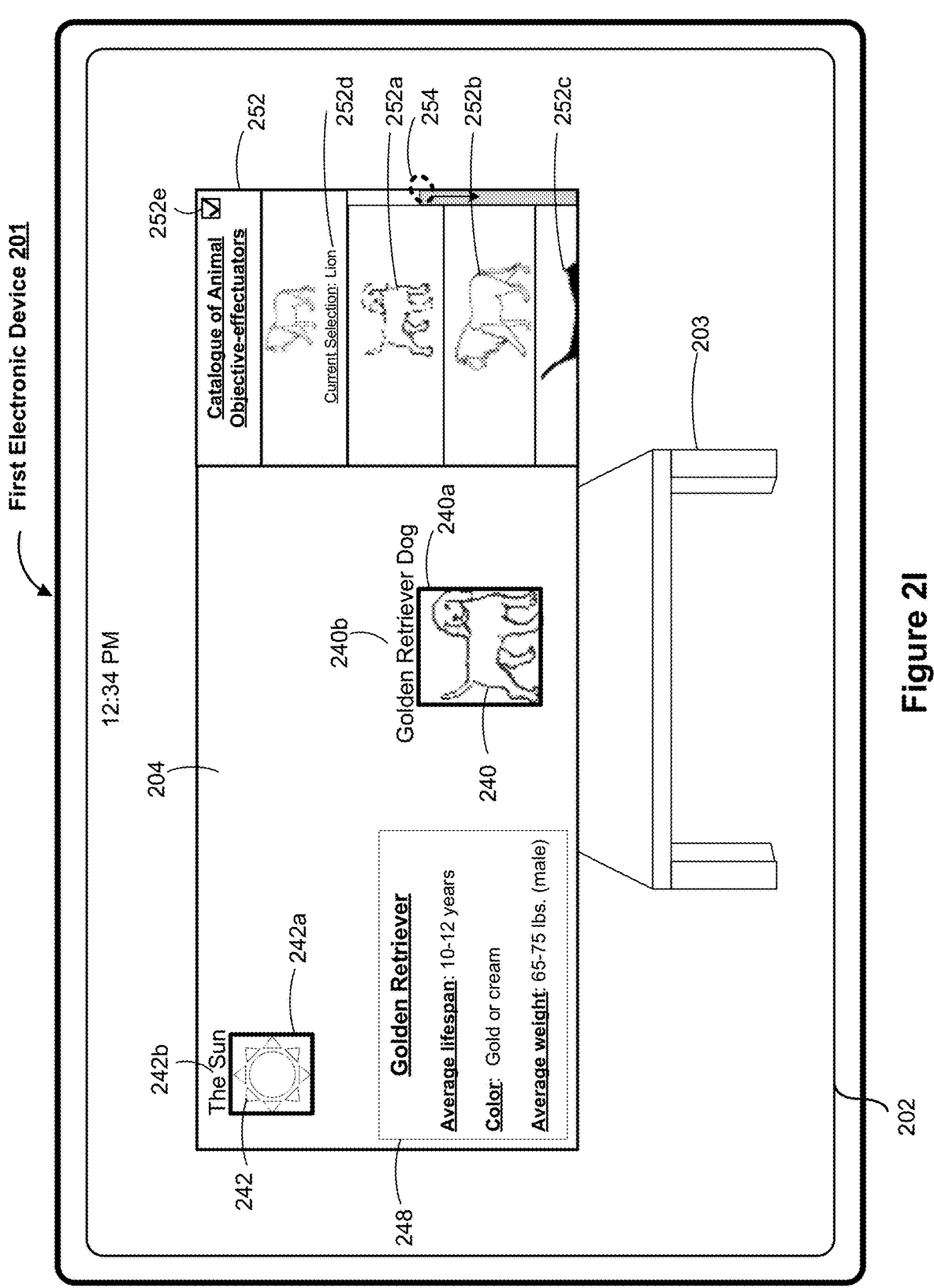
Figure 2J:
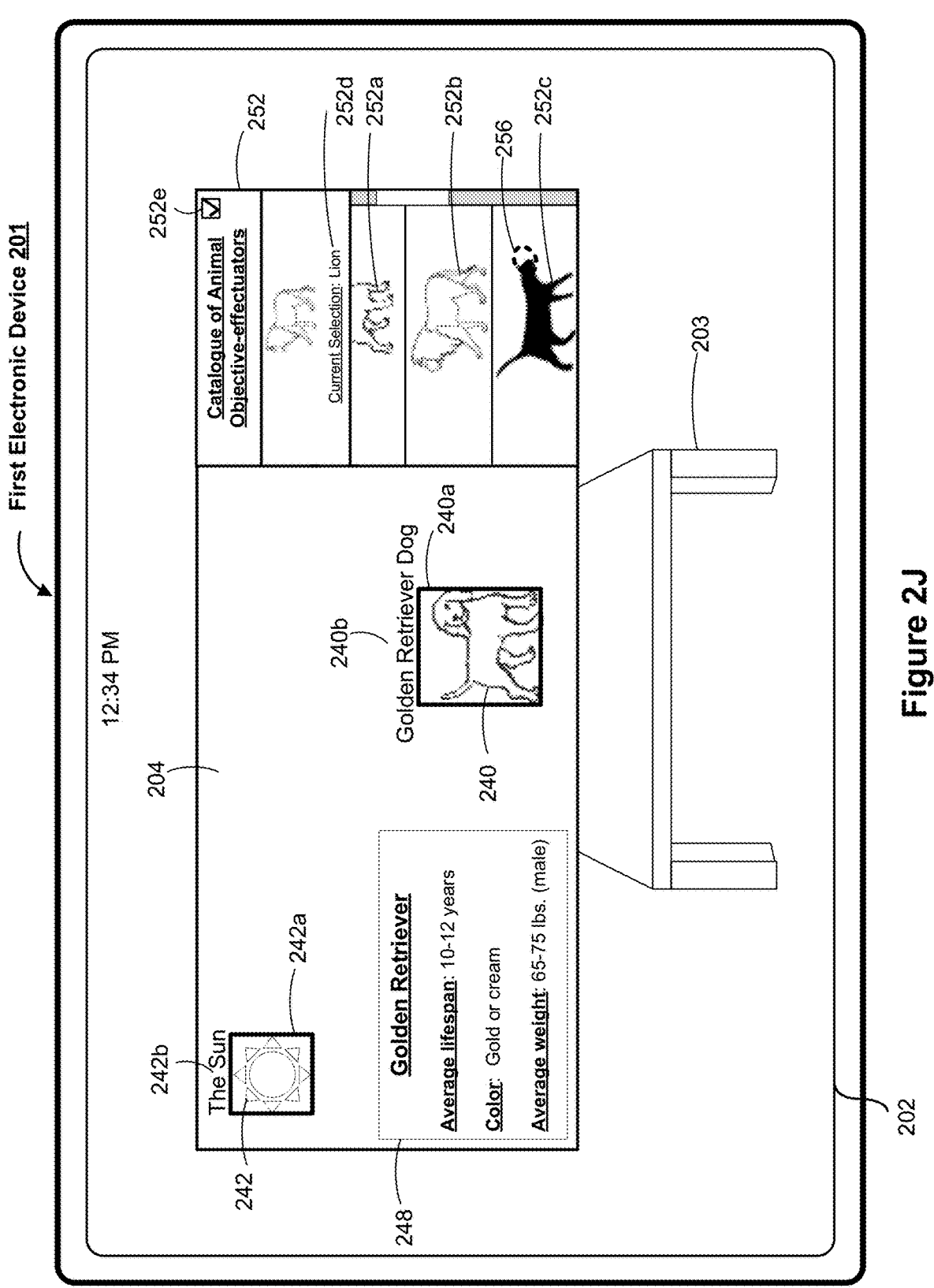
Figure 2K:
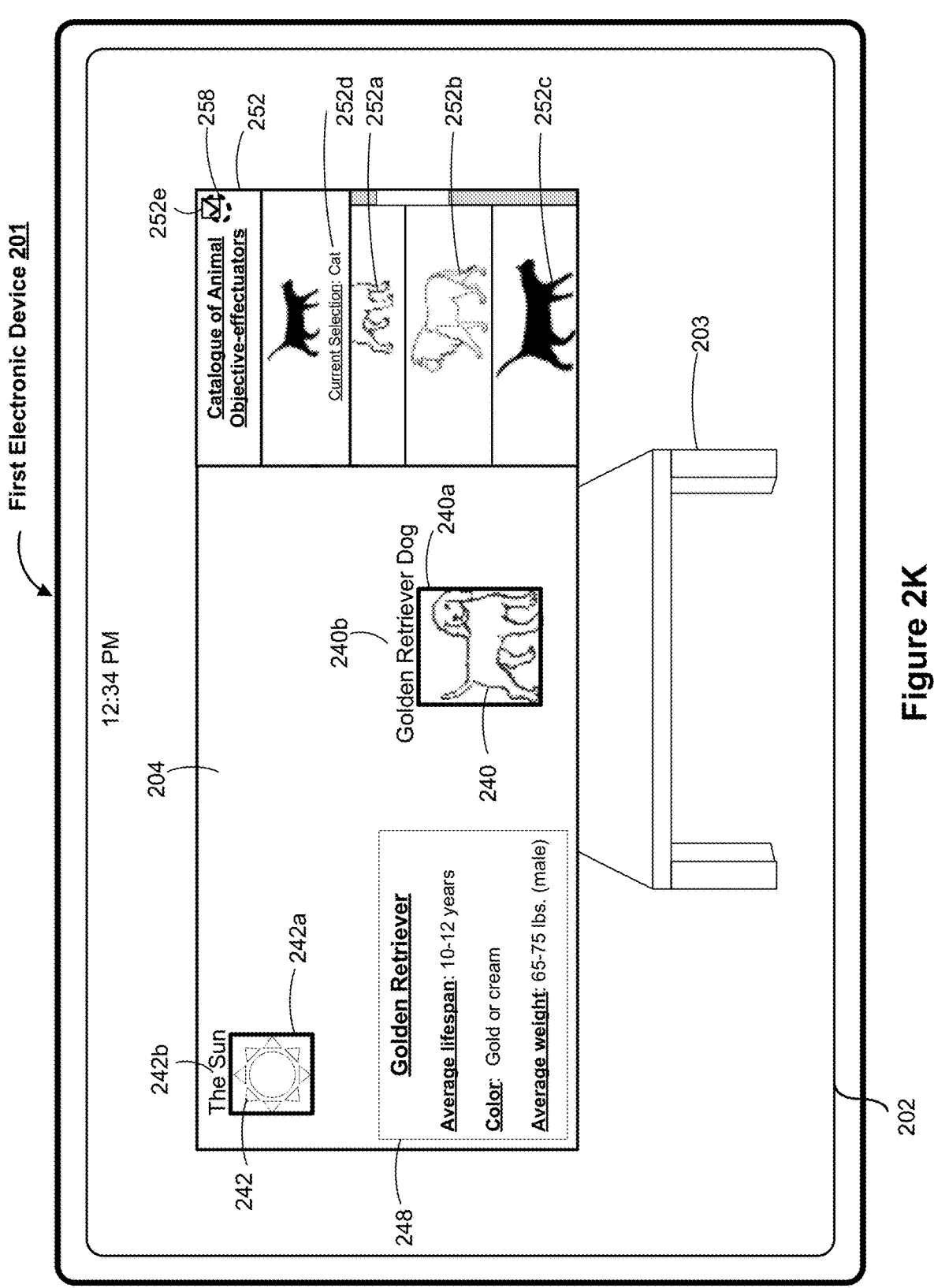
Figure 2L:
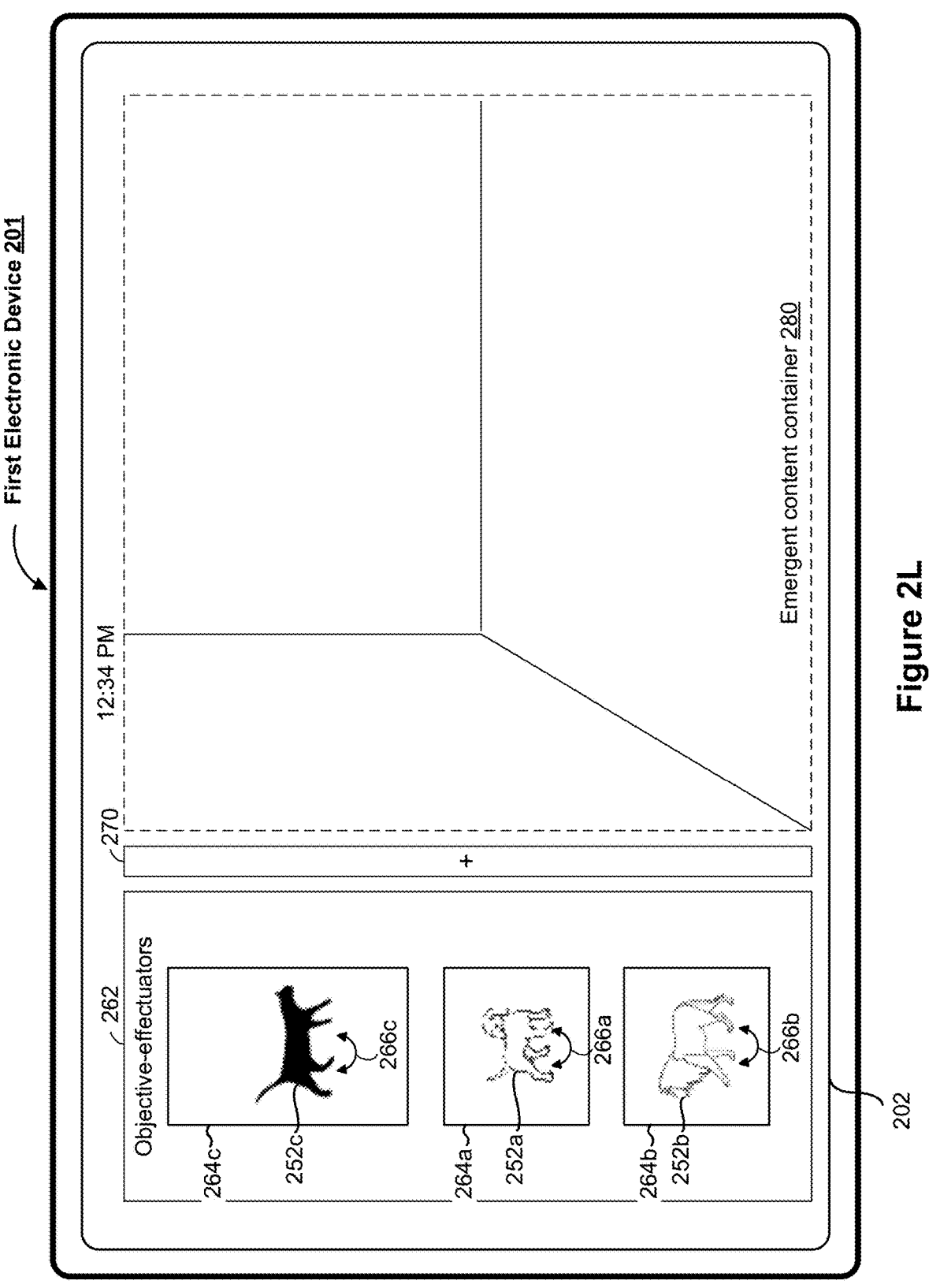
Figure 2M:
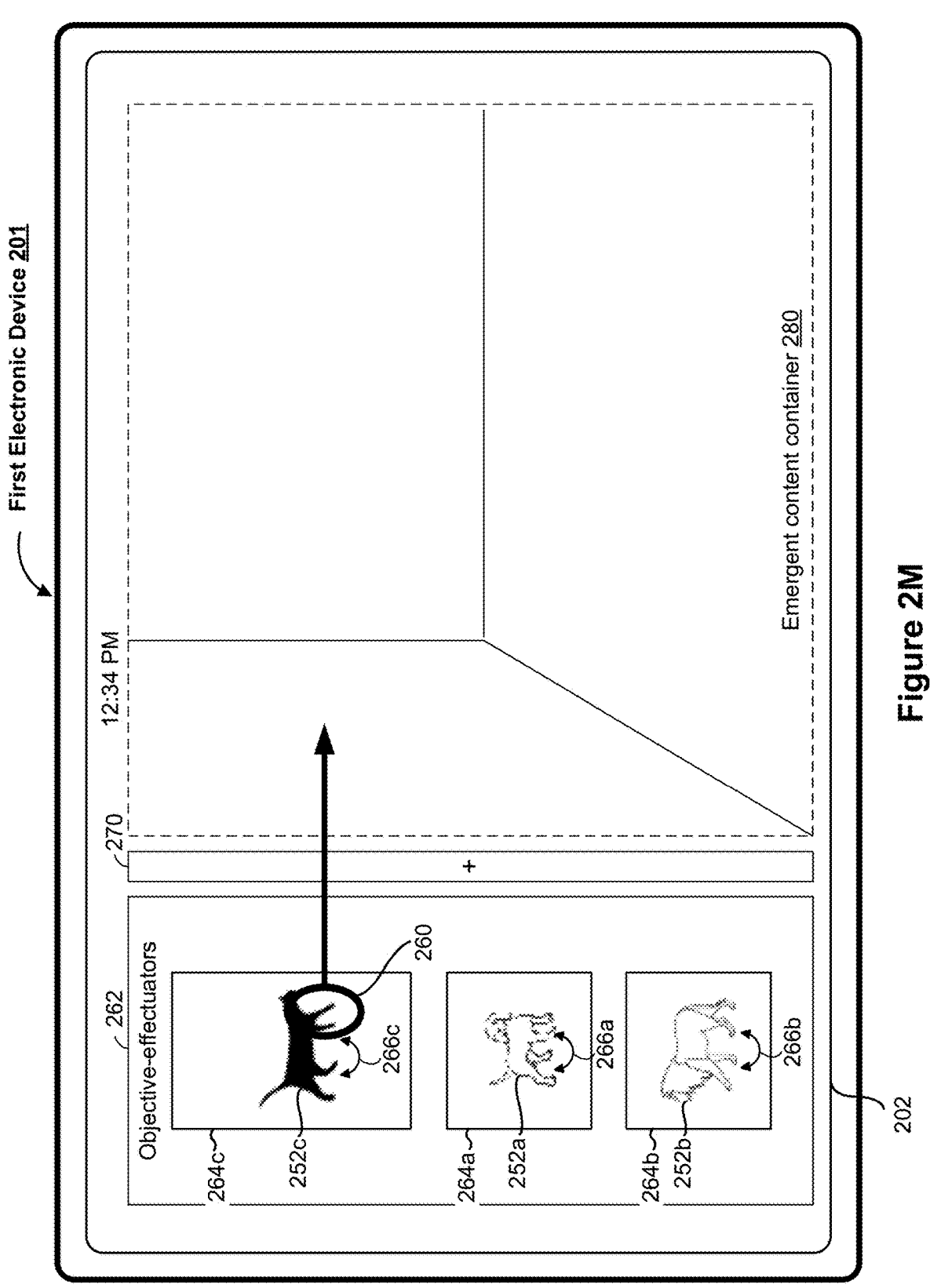
Figure 2N:
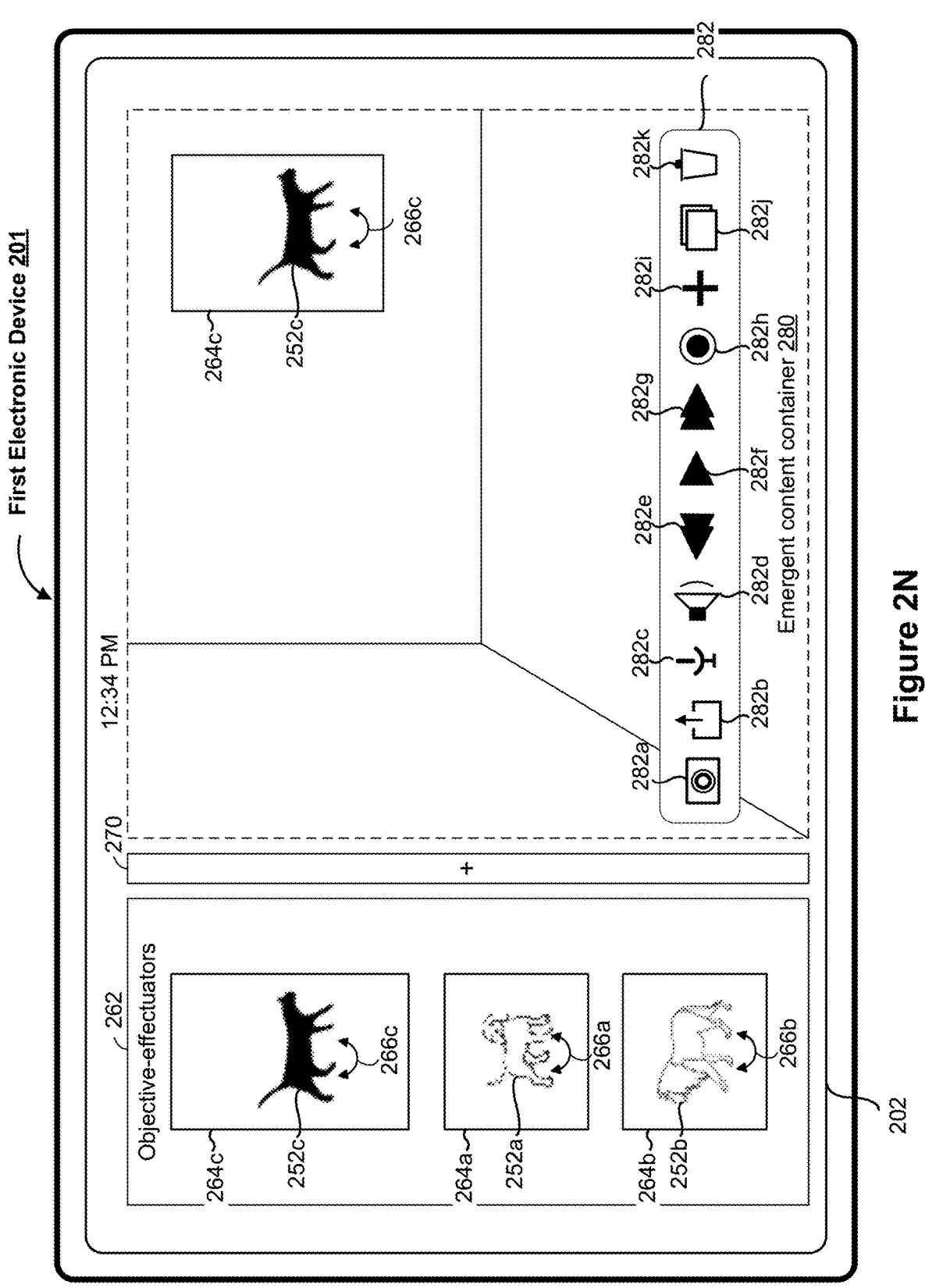

FIGS. 2A-2N are an example of a physical environment 200 including a first electronic device 201 displaying extended reality (XR) content corresponding to a semantically-identified object within an unstructured video stream being displayed on a second electronic device 210. The physical environment 200 includes the first electronic device 201, the second electronic device 210, a wall 220, and a table 230 supporting the second electronic device 210. According to various implementations, the first electronic device 201 is similar to and adapted from the multifunction device 100 shown in FIG. 1. One of ordinary skill in the art will appreciate that the physical environment 200 may include fewer or additional physical features, such as a television wall mount instead of the table 230 supporting the second electronic device 210.

As illustrated in FIG. 2A, the second electronic device 210 corresponds to a television displaying a second unstructured video stream 211, such as streaming video content, a movie, an image slideshow, etc. One of ordinary skill in the art will appreciate that the second electronic device 210 may correspond to any one of a variety of types of electronic devices capable of displaying video or image content, such as a tablet, smartphone, laptop, and/or the like. In some implementations, the second unstructured video stream 211 corresponds to a conventional video stream including a sequence of images, each of which includes a number of pixels having corresponding values. Namely, as illustrated in FIGS. 2A-2N, the second unstructured video stream 211 includes a set of changing pixel values indicating a dog 211a that is walking towards a tree 211c in order to get shade from the Sun 211b. Notably, the second unstructured video stream 211 does not, however, include or provide semantic information associated with the pixels.

The first electronic device 201 device obtains a first unstructured video stream 204 that provides pixel values for a plurality of pixels. In some implementations, the first unstructured video stream 204 includes a portion of the second unstructured video stream 211 or a representation thereof. The first electronic device 201 is positioned (e.g., angled) relative to the second electronic device 210 such that an image sensor of the first electronic device 201 (e.g., a rear-facing camera) obtains pass-through image data including the portion of the second unstructured video stream 211 and optionally other physical features of the physical environment 200. For example, as illustrated in FIG. 2A, the first electronic device 201 obtains pass-through image data that includes a respective representation 203 of the table 230 and the first unstructured video stream 204 that corresponds to the second unstructured video stream 211 being displayed on the second electronic device 210. Accordingly, the first unstructured video stream 204 includes the dog 240, the Sun 242, and the tree 244. In some implementations, as illustrated in FIG. 2A, the first electronic device 201 renders and displays (e.g., via touch-sensitive display system 112 in FIG. 1), on a user interface 202, the pass-through image data including the respective representation 203 of the table 230 and the first unstructured video stream 204.

For ease of illustration, a larger version of the first electronic device 201 within the physical environment 200 is shown in FIG. 2B. The first electronic device 201 continues to obtain pass-through image data including the second unstructured video stream 211 being displayed on the second electronic device 210, which includes the dog 211a moving closer to the tree 211c. Accordingly, in FIG. 2B the first electronic device 201 displays the dog 240 having moved closer to the tree 244, as compared with FIG. 2A.

The first electronic device 201 generates respective pixel characterization vectors for a portion of the plurality of pixels in the first unstructured video stream 204. Generating each of the respective pixel characterization vectors includes determining a respective instance label value. Generation of the respective pixel characterization vectors and instance label values is detailed below.

The first electronic device 201 identifies a first object within the portion of the plurality of pixels associated with a first instance label value. With reference to FIG. 2C, the first electronic device 201 identifies as the first object the dog 240 within the first unstructured video stream 204, as illustrated by corresponding object identifier 240a. One of ordinary skill in the art will appreciate that in some implementations, the first electronic device 201 displays the object identifier 240a with different characteristics (e.g., different shape, color, size) or foregoes displaying the object identifier 240a altogether. In some implementations, the first electronic device 201 identifies multiple objects within the first unstructured video stream 204. For example, with reference to FIG. 2C, the first electronic device 201 identifies as a second object the Sun 242 and as a third object the tree 244, as indicated by the object identifier 242a and the object identifier 244a, respectively. Further details regarding identification of the objects are provided below.

The first electronic device 201 generates respective semantic label values corresponding to pixels associated with the first object. The respective semantic label values are added to pixel characterization vectors associated with the first object. In some implementations, the first electronic device 201 appends respective semantic label values to the pixel characterization vectors associated with the first object. Continuing with the previous example, the first electronic device 201 generates respective semantic label values of "Golden Retriever Dog" for the dog 240, as indicated by the corresponding semantic label value identifier 240b in FIG. 2D. One of ordinary skill in the art will appreciate that in some implementations, the first electronic device 201 generates and displays a different or additional corresponding semantic label value identifier 240*b* (e.g., "Furry Friend") and/or foregoes displaying the corresponding semantic label value identifier 240*b* altogether. In some implementations, the first electronic device 201 generates multiple respective semantic label values corresponding to multiple objects within the first unstructured video stream 204. For example, the first electronic device 201 generates a respective semantic label value of "The Sun" for the Sun 242 and a respective semantic label value of "Palm Tree" for the tree 244, as indicated by a semantic label value identifier 242*b* and a semantic label value identifier 244*b* in FIG. 2D, respectively. Generation of the respective semantic label values is detailed below.

As illustrated in FIGS. 2E-2N, in some implementations, the first electronic device 201 displays extended reality (XR) content that corresponds to identified object(s) in the first unstructured video stream 204 in response to obtaining an input directed to a XR affordance corresponding to the identified object(s). For example, as illustrated in FIG. 2E, the first electronic device 201 obtains a first input 246 corresponding to the object identifier 240*a* that identifies the dog 240.

As illustrated in FIG. 2F, in accordance with a determination that the first input corresponds to a first input type, the first electronic device 201 displays informational XR content 248 corresponding to the dog 240. In some implementations, the informational XR content is based on the respective semantic label value identifier 240*b* of "Golden Retriever Dog." Namely, the informational XR content 248 includes various facts about a Golden Retriever, such as its average lifespan, color, and average weight.

As illustrated in FIG. 2G, the first electronic device 201 obtains a second input 250 corresponding to the object identifier 240*a* that identifies the dog 240. The second input 250 corresponds to a second input type that is different from the first input type corresponding to the first input 246 in FIG. 2E. In some implementations, the first input type corresponds to a first gesture (e.g., a tap input or a swipe left input) and the second input type corresponds to a second gesture (e.g., a long press input, a force touch input, or a swipe right input) that is different from the first gesture.

In some implementations, the first input 246 and/or the second input 250 corresponds to eye tracking data that indicates the gaze position of a user. For example, with reference to FIGS. 2A and 4, the eye tracking data indicates that the gaze position of the user 450 corresponds to the dog 240.

As illustrated in FIG. 2H, in accordance with a determination that the second input 250 corresponds to the second input type, the first electronic device 201 displays a catalogue of animal objective-effectuators 252 including a dog objective-effectuator 252*a* corresponding to the dog 240, as well as a lion objective-effectuator 252*b*, and a partially visible cat objective-effectuator 252*c*. In some implementations, the dog objective-effectuator 252*a* is based on the respective semantic label values of "Golden Retriever Dog" 240*b* corresponding to the dog 240. Each of the catalogue of animal objective-effectuators 252 is characterized by a corresponding set of predefined objectives and a corresponding set of visual rendering attributes. In various implementations, an objective-effectuator performs one or more actions in order to effectuate (e.g., complete, satisfy, or achieve) one or more objectives. One of ordinary skill in the art will appreciate that a catalogue of objective-effectuators may include entities other than or in addition to animals, such as people (real or fictional), machines (e.g., automobiles, airplanes, etc.), weather patterns, and/or the like.

The catalogue of animal objective-effectuators 252 also includes a current selection indicator 252*d* that indicates the currently selected objective-effectuator, which corresponds to the lion objective-effectuator 252*b* in FIG. 2H. As further illustrated in FIG. 2H, the catalogue of animal objective-effectuators 252 also includes an objective-effectuator interface request affordance 252*e,* the operation of which will be described below.

As illustrated in FIG. 2I, the first electronic device 201 obtains an input 254 corresponding to a scroll down operation with respect to the scroll bar of the catalogue of animal objective-effectuators 252. In response to obtaining the input 254 in FIG. 2I, the first electronic device 201 scrolls down in order to make the cat objective-effectuator 252*c* visible and make the dog objective-effectuator 252*a* visible in FIG. 2J.

As illustrated in FIG. 2J, the first electronic device 201 obtains an input 256 corresponding to the cat objective-effectuator 252*c*. In response to obtaining the input 256 in FIG. 2J, the first electronic device 201 changes the current selection indicator 252*d* from the lion objective-effectuator 252*b* to the cat objective-effectuator 252*c,* as illustrated in FIG. 2K.

As illustrated in FIG. 2K, the first electronic device 201 obtains an input 258 corresponding to the objective-effectuator interface request affordance 252*e*. In response to obtaining the input 258 in FIG. 2K, the first electronic device 201 changes the user interface 202 from the pass-through image data to an objective-effectuator interface in FIG. 2L. The objective-effectuator interface includes an objective-effectuator pane 262, a new container affordance 270, and an emergent content container 280.

The objective-effectuator pane 262 includes the cat objective-effectuator 252*c* within a cat objective-effectuator container 264*c*, the dog objective-effectuator 252*a* within a dog objective-effectuator container 264*a*, and the lion objective-effectuator 252*b* within a lion objective-effectuator container 264*b*. Because the cat objective-effectuator 252*c* is currently selected (See the current selection indicator 252*d* in FIG. 2K), the cat objective-effectuator 252*c* is positioned at the top of the objective-effectuator pane 262 and enlarged with respect to the other animal objective-effectuators.

In various implementations, an objective-effectuator performs one or more actions. In some implementations, an objective-effectuator performs a sequence of actions. In some implementations, the emergent content container 280 determines the actions that an objective-effectuator is to perform. In some implementations, the actions of the objective effectuators are within a degree of similarity to actions that the corresponding characters/things. For example, in some implementations, the dog objective-effectuator 252*a* is characterized by objectives of chasing cars, fetching a ball, etc. As another example, in some implementations, the lion objective-effectuator 252*b* is characterized by objectives of chasing gazelle, drinking from a lake, etc.

In some implementations, the cat objective-effectuator container 264*c* includes a cat manipulation affordance 266*c* to manipulate the cat objective-effectuator 252*c,* the dog objective-effectuator container 264*a* includes a dog manipulation affordance 266*a* to manipulate the dog objective-effectuator 252*a,* and the lion objective-effectuator container 264*b* includes a lion manipulation affordance 266*b* to manipulate the lion objective-effectuator 252*b*. For example, a respective manipulation affordance enables rotation, size change, and/or positional change of the corresponding objective-effectuator.

In some implementations, the emergent content container 280 enables an objective-effectuator to perform actions that satisfy an objective (e.g., a set of predefined objectives) of the objective-effectuator. In some implementations, first electronic device 201 receives an input (e.g., a user input) to instantiate an objective-effectuator in the emergent content container 280. In such implementations, the emergent content container 280 generates actions for the objective-effectuator after the objective-effectuator is instantiated in the emergent content container 280. For example, in some implementations, the emergent content container 280 synthesizes actions that satisfy a set of predefined objectives for the objective-effectuator. In some implementations, the emergent content container 280 selects the actions from a set of predefined actions.

In some implementations, the emergent content container 280 includes a computer-mediated scene. For example, in some implementations, the computer-mediated scene forms a background for the emergent content container 280. In some implementations, the computer-mediated scene includes a virtual scene that is a simulated replacement of a real-world scene. In other words, in some implementations, the computer-mediated scene is simulated by the first electronic device 201. In such implementations, the computer-mediated scene is different from a real-world scene where the first electronic device 201 is located. In some implementations, the computer-mediated scene includes an augmented scene that is a modified version of a real-world scene. For example, in some implementations, the first electronic device 201 modifies (e.g., augments) the real-world scene where the first electronic device 201 is located in order to generate the computer-mediated scene. In some implementations, the first electronic device 201 generates the computer-mediated scene by simulating a replica of the real-world scene where the first electronic device 201 is located. In some implementations, the first electronic device 201 generates the computer-mediated scene by removing and/or adding items from the simulated replica of the real-world scene where the first electronic device 201 is located.

In some implementations, the emergent content container 280 is generated based on a user input. For example, in some implementations, the first electronic device 201 receives a user input indicating a terrain for the emergent content container 280. In such implementations, the first electronic device 201 configures the emergent content container 280 such that the emergent content container 280 includes the terrain indicated via the user input. In some implementations, the user input indicates environmental conditions. In such implementations, first electronic device 201 configures the emergent content container 280 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain or snow).

In some implementations, when the new container affordance 270 is selected, the first electronic device 201 creates a new emergent content container. As such, in some implementations, the first electronic device 201 displays multiple emergent content containers (e.g., two or more emergent content, such as the emergent content container 280 adjacent to one or more additional emergent content containers (not shown).

Referring to FIG. 2M, the first electronic device 201 detects an input 260 at a location corresponding to the cat objective-effectuator container 264c. In the example of FIG. 2M, the input 260 corresponds to a request to instantiate the cat objective-effectuator 252c in the emergent content container 280. In the example of FIG. 2M, detecting the input 260 includes detecting that the cat objective-effectuator container 264c has been selected, and that the cat objective-effectuator container 264c is being dragged into a display region that corresponds to the emergent content container 280. In some implementations, detecting the input 260 includes detecting that the cat objective-effectuator container 264c is being dragged into the emergent content container 280.

Referring to FIG. 2N, after detecting the input 260 shown in FIG. 2M, the first electronic device 201 instantiates the cat objective-effectuator 252c in the emergent content container 280. In the example of FIG. 2N, the emergent content container 280 includes the cat objective-effectuator container 264c because the emergent content container 280 is being setup. In other words, in the example of FIG. 2N, the emergent content container 280 is in an edit mode in which objective-effectuators are being added to the emergent content container 280.

As illustrated in FIG. 2N, in various implementations, the emergent content container 280 includes various container affordances 282. In some implementations, the container affordances 282 are grouped into a container affordance bar. In various implementations, the container affordances 282 allow various operations to be performed in relation to the emergent content container 280. For example, in some implementations, the container affordances 282 include a screen capture affordance 282a which, in response to being selected, captures an image of the emergent content container 280. In some implementations, the container affordances 282 include a share affordance 282b which, in response to being selected, provides options to share the emergent content container 280 with other devices (e.g., other devices of the same user and/or other devices of other users).

In some implementations, the container affordances 282 include a microphone (mic) affordance 282c which, in response to being selected, allows the user of the first electronic device 201 to interact with the objective-effectuators that are instantiated in the emergent content container 280. For example, in some implementations, in response to detecting a selection of the mic affordance 282c, the emergent content container 280 receives an audio input. In such implementations, the emergent content container 280 causes the objective-effectuators that are instantiated in the emergent content container 280 to respond to the audio input. For example, the emergent content container 280 changes the actions that the instantiated objective-effectuators perform in response to the audio input.

In some implementations, the container affordances 282 include a speaker affordance 282d that, when selected, enables the user of the first electronic device 201 to control a volume associated with the emergent content container 280 (e.g., so that the user can listen to dialogues recited by the objective-effectuators instantiated in the emergent content container 280).

In some implementations, the container affordances 282 include content playback affordances such as a rewind affordance 282e, a play affordance 282f and a fast forward affordance 282g. In some implementations, a selection of the play affordance 282f causes the emergent content container 280 to transition from the edit mode to a play mode in which the objective-effectuators instantiated in the emergent content container 280 start performing their respective actions.

In some implementations, the rewind affordance 282e, when selected, causes the content displayed by the emergent content container 280 to be rewound. In some implementations, the fast forward affordance 282g, when selected, causes the content displayed by the emergent content container 280 to be fast-forwarded. In some implementations, the container affordances 282 include a record affordance 282h that, when selected, causes the content displayed by the emergent content container 280 to be recorded.

In some implementations, the container affordances 282 include an add objective-effectuator affordance 282i that, when selected, provides an option to add an objective-effectuator to the emergent content container 280. In some implementations, the add objective-effectuator affordance 282i allows additional instances of an objective-effectuator that is already instantiated in the emergent content container 280 to be instantiated. In some implementations, the add objective-effectuator affordance 282i allows an instance of an objective-effectuator that is not currently instantiated in the emergent content container 280 to be instantiated.

In some implementations, the container affordances 282 include a duplicate objective-effectuator affordance 282j that, when selected, provides an option to duplicate (e.g., replicate) an objective-effectuator that is already instantiated in the emergent content container 280. In the example of FIG. 2N, a selection of the duplicate objective-effectuator affordance 282j provides an option to duplicate the cat objective-effectuator 252c that is already instantiated in the emergent content container 280.

In some implementations, the container affordances 282 include a delete objective-effectuator affordance 282k that, when selected, provides an option to delete an objective-effectuator that is instantiated in the emergent content container 280. In the example of FIG. 2N, a selection of the delete objective-effectuator affordance 282k provides an option to delete the cat objective-effectuator 252c that is already instantiated in the emergent content container 280.

Figure 3A:
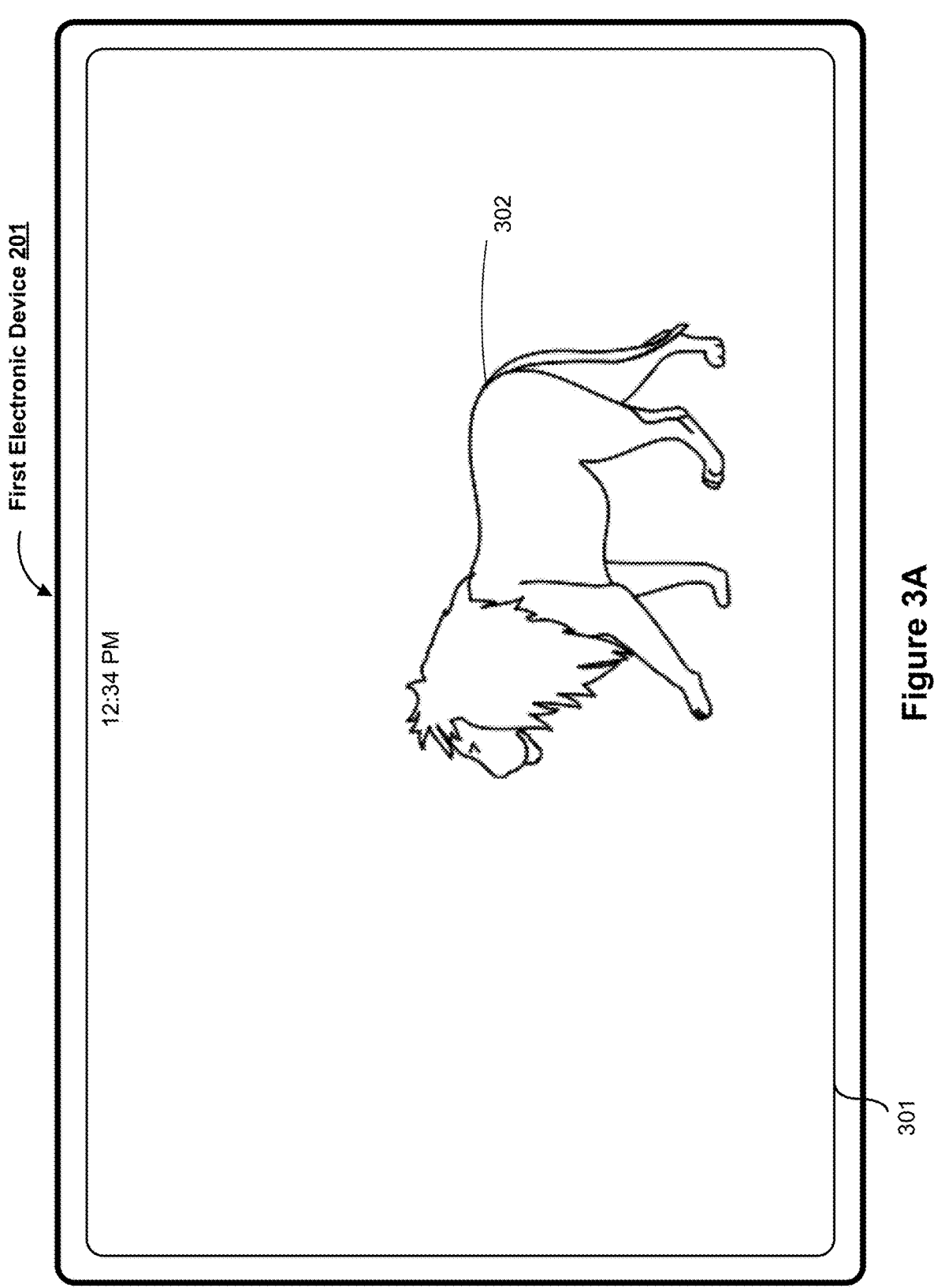
FIGS. 3A-3J are an example of a first electronic device providing a XR experience based on input(s) to a XR affordance corresponding to a semantically-identified object.

FIGS. 3A-3J are an example of a first electronic device 201 providing a XR experience based on input(s) to a XR affordance corresponding to a semantically-identified object. As illustrated in FIG. 3A, the first electronic device 201 displays a user interface 301 corresponding to a first unstructured video stream including a lion 302.

In some implementations, the first electronic device 201 obtains the first unstructured video stream by obtaining, via an image sensor, pass-through image data including a portion of a second unstructured video stream being displayed on a second electronic device, such as is described above with reference to FIGS. 2A-2N. The first unstructured video stream corresponds to a portion (e.g., some or all of) the second unstructured video stream.

In some implementations, the first electronic device 201 obtains the first unstructured video stream including the lion 302 independent of pass-through image data. In other words, the first electronic device 201 obtains the first unstructured video stream without utilizing an image sensor of the first electronic device 201 to obtain the pass-through image data. For example, in some implementations, the first electronic device 201 obtains the first unstructured video stream from local memory (e.g., a non-transitory memory, such a video file stored locally) and/or downloaded from the Internet (e.g., streaming on a website).

Figure 3B:
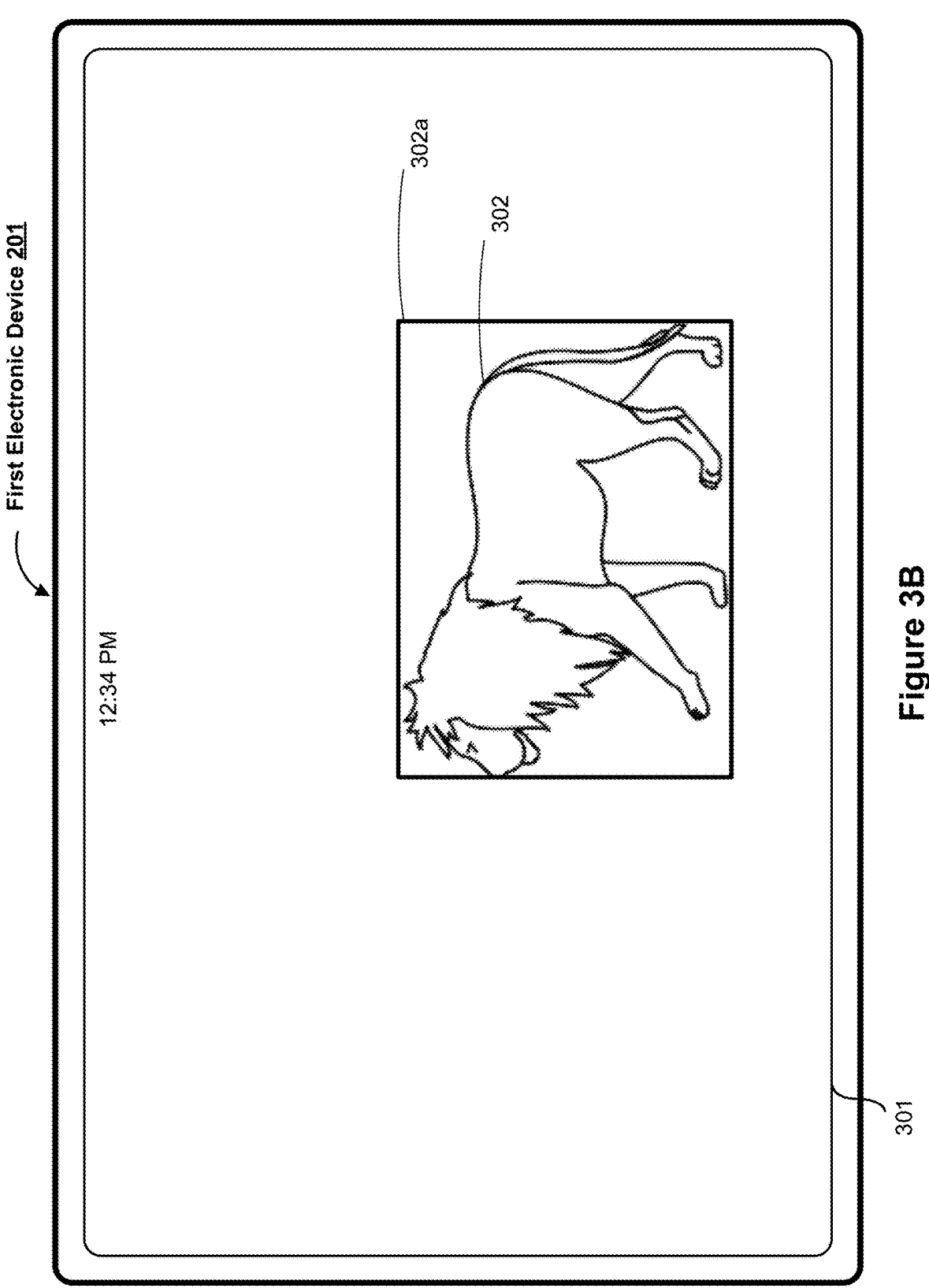

In some implementations, the first electronic device 201 semantically identifies the lion 302 by generating corresponding semantic label values of, for example, "lion," "male," and "adult," as is described in detail below. With reference to FIG. 3B, the first electronic device 201 identifies the lion 302 within the first unstructured video stream, as illustrated by corresponding object identifier 302a. In some implementations, the object identifier 302a corresponds to a XR affordance. One of ordinary skill in the art will appreciate that the object identifier 302a may take any shape or form, including informational XR content based on the semantic label value (e.g., "this is an adult male lion") and/or animations, such as the lion 302 flashing, changing color, and/or moving with respect to physical objects in the physical environment (e.g., jumping onto a table, such as the table 203 illustrated in FIGS. 2A-2N).

Figure 3C:
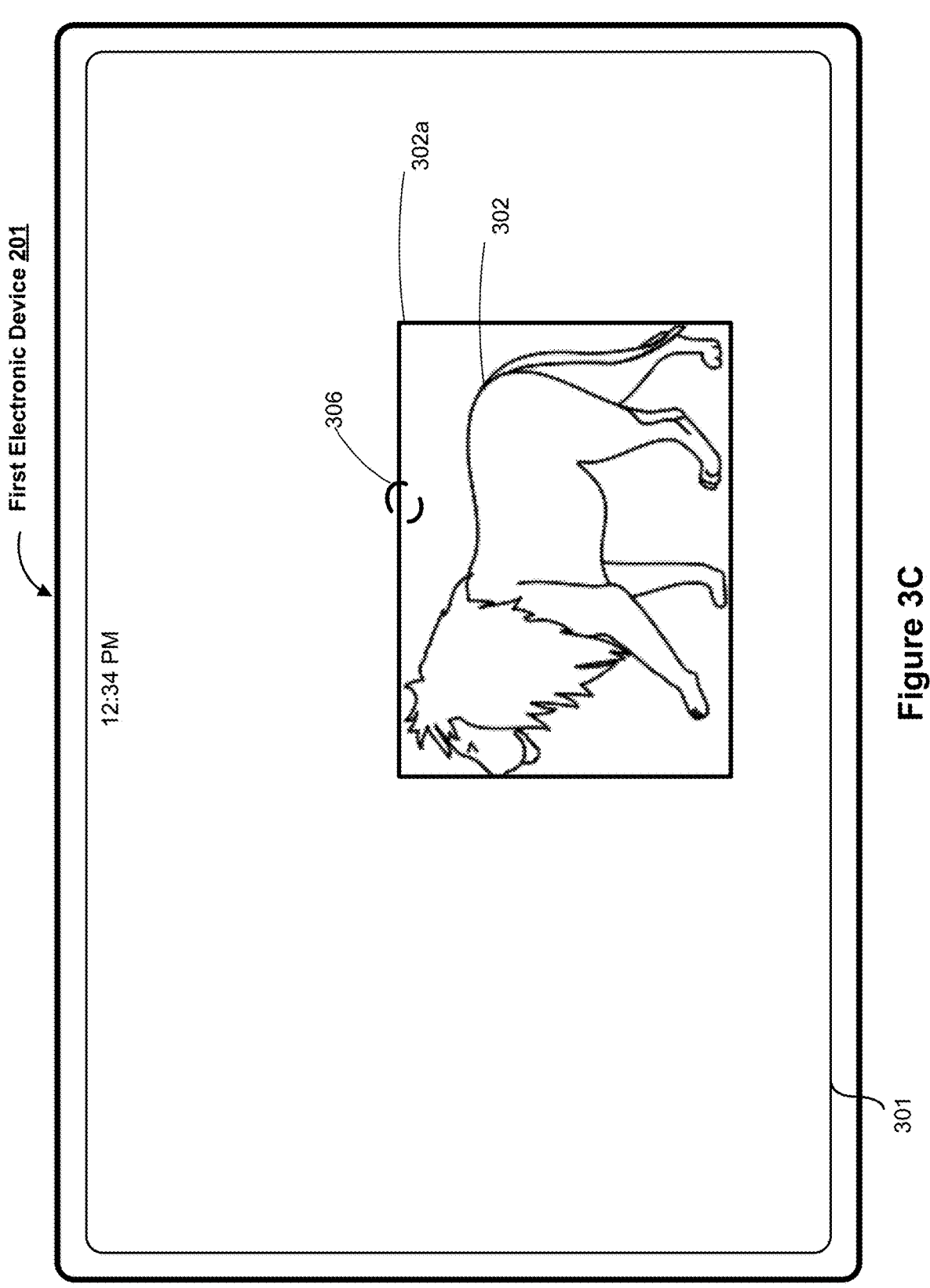
Figure 3D:
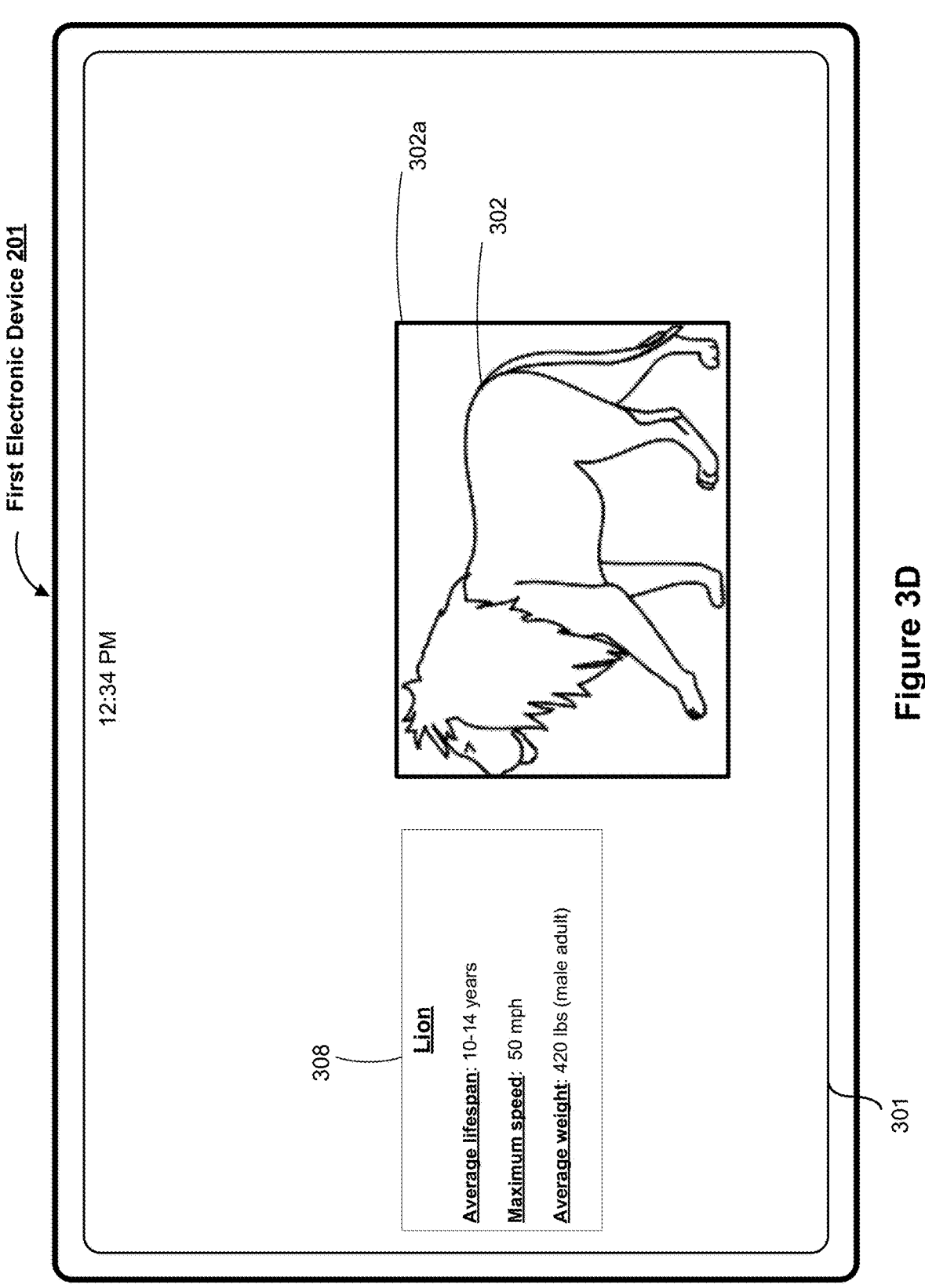

In some implementations, the first electronic device 201 provides a XR experience based on input(s) that are directed to the object identifier 302a. As illustrated in FIG. 3C, the first electronic device 201 obtains a first input 306 corresponding to the object identifier 302a. In accordance with a determination that the first input 306 corresponds to a first input type (e.g., a force touch input or long touch input), the first electronic device 201 displays informational XR content 308 corresponding to the lion 302 in FIG. 3D. In some implementations, the informational XR content 308 is based on the respective semantic label values corresponding to pixels associated with the lion 302. For example, as illustrated in FIG. 3D, the informational XR content 308 is based on a combination of the determined semantic label values of "lion," "male," and "adult" corresponding to the lion 302. One of ordinary skill in the art will appreciate that other forms of informational XR content may be presented, such as image(s) and/or video(s) that are displayed, or an audio clip played via a speaker (e.g., prerecorded speech clip saying "this is a lion").

Figure 3E:
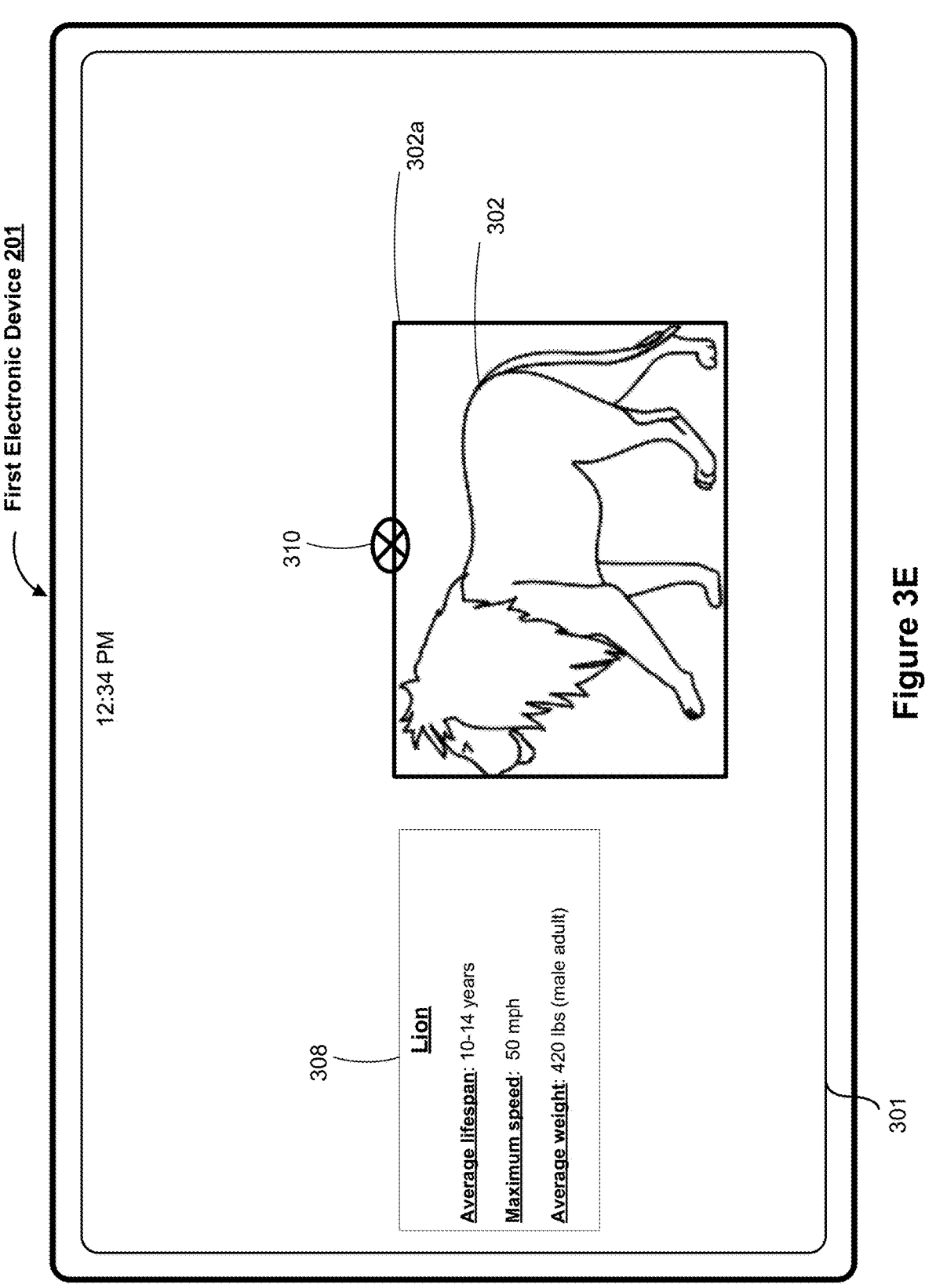
Figure 3F:
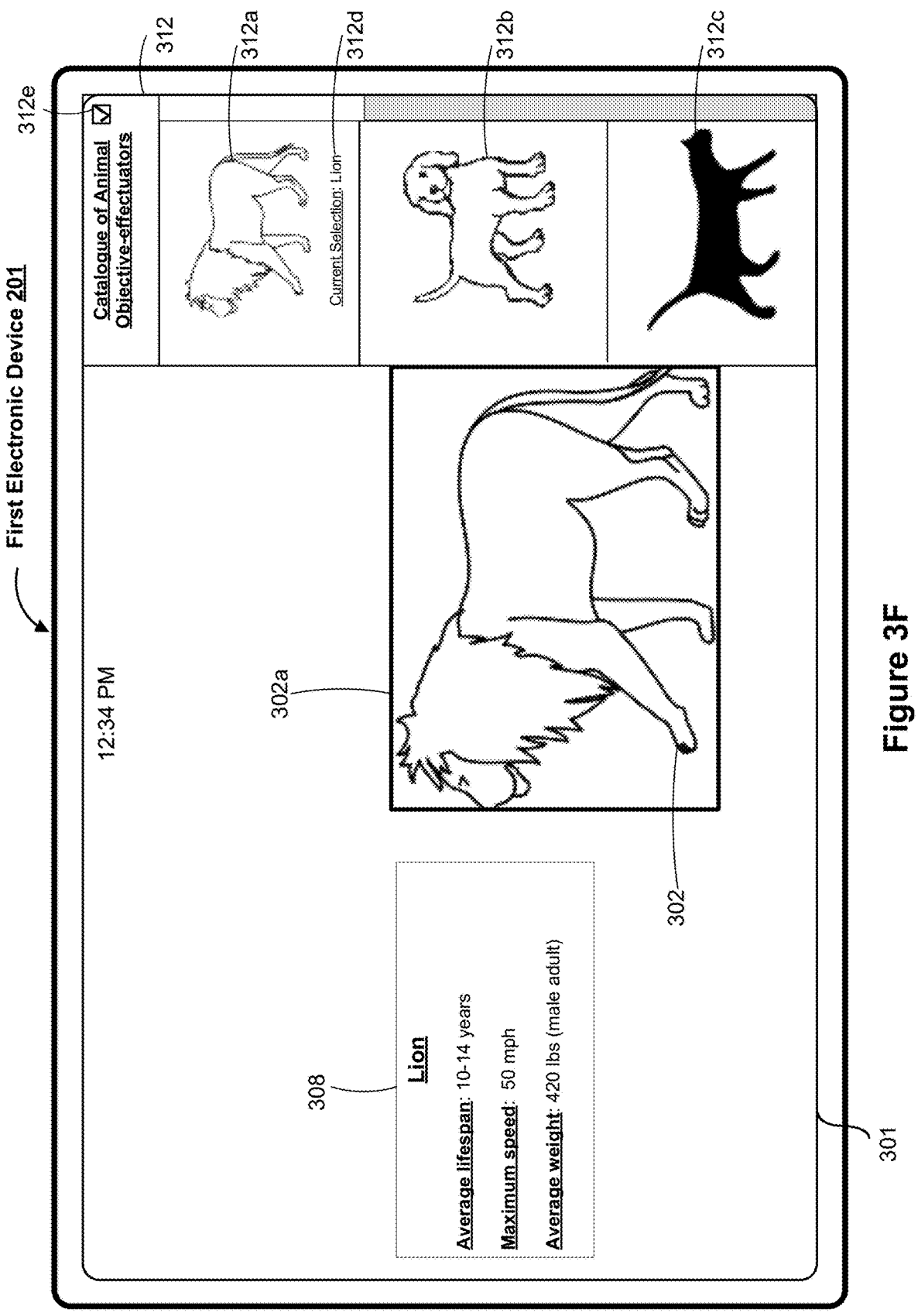

As illustrated in FIG. 3E, the first electronic device 201 obtains a second input 310 corresponding to the object identifier 302a. In accordance with a determination that the second input 310 corresponds to a second input type (e.g., tap, double tap) different form the first input type, the first electronic device 201 displays a catalogue of animal objective-effectuators 312 in FIG. 3F. In some implementations, the catalogue of animal objective-effectuators 312 is similar to the catalogue of animal objective-effectuators 252 in FIGS. 2H-2K. The catalogue of animal objective-effectuators 312 includes a lion objective-effectuator 312a as a current selection indicator 312d because the lion 302 was selected via the second input 310 in FIG. 3E. The catalogue of animal objective-effectuators 312 also includes a dog objective-effectuator 312b and a cat objective-effectuator 312c. The catalogue of animal objective-effectuators 312 also includes an objective-effectuator interface request affordance 312e, the operation of which will be described below.

Figure 3G:
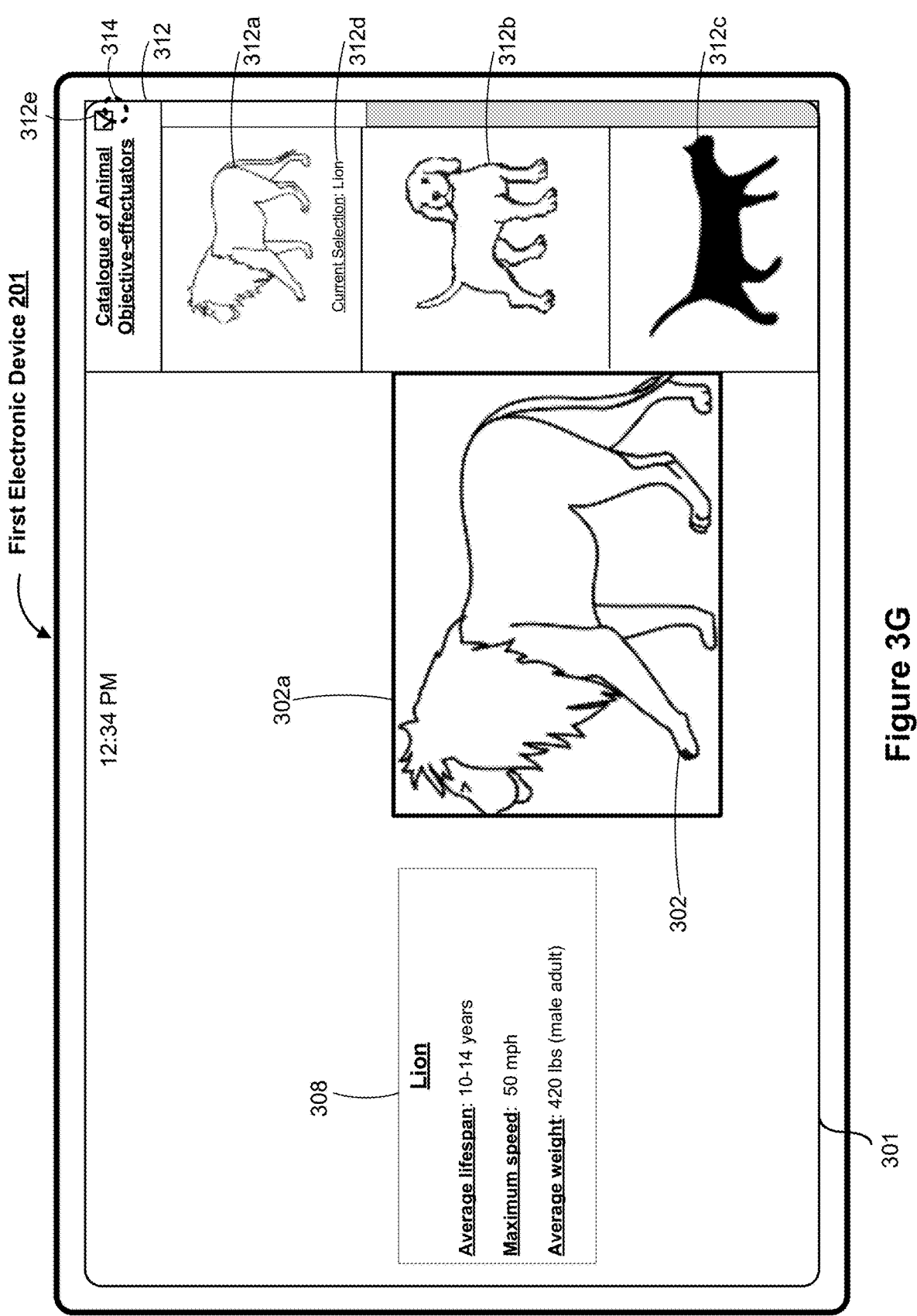
Figure 3H:
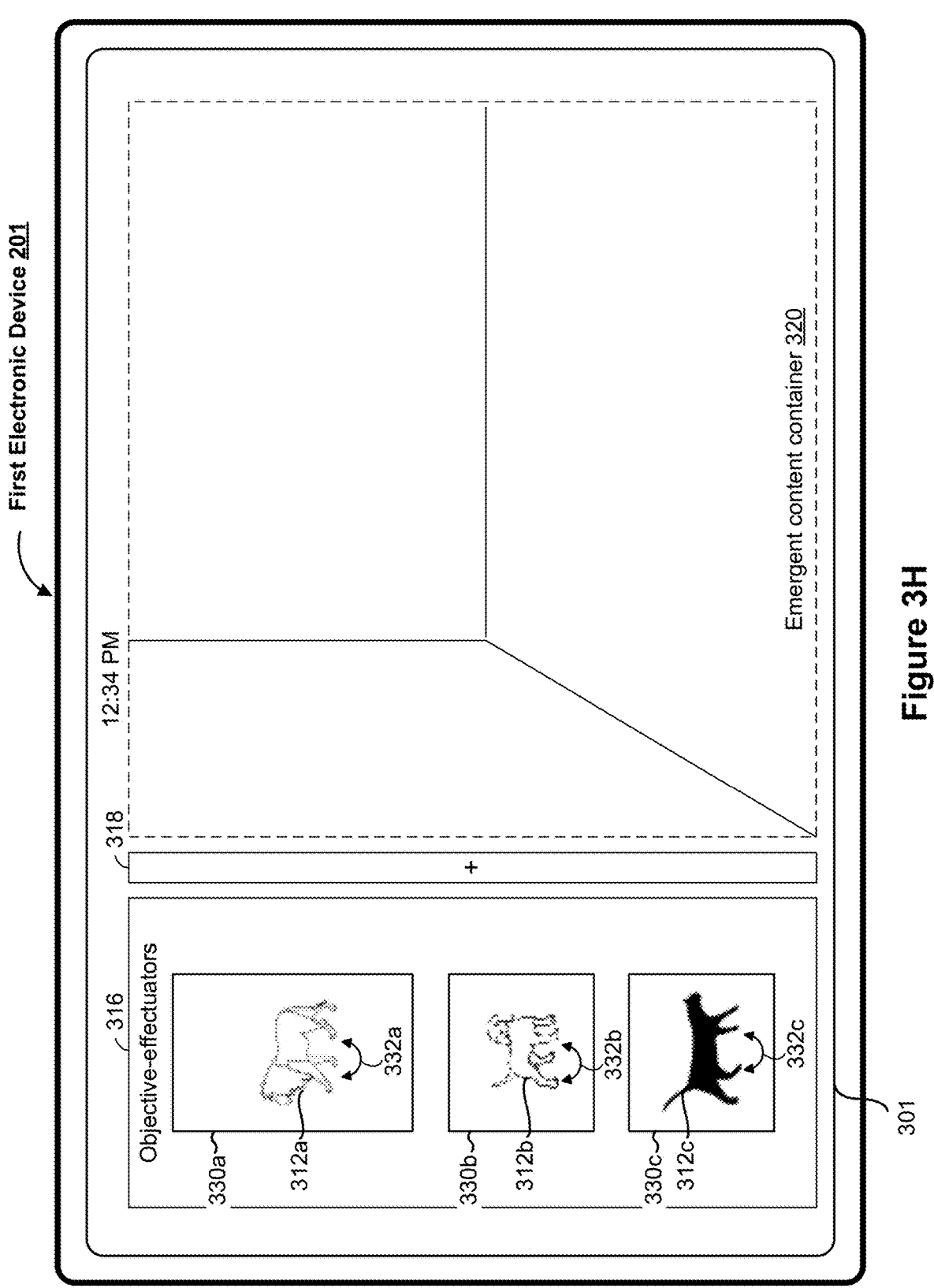

As illustrated in FIG. 3G, the first electronic device 201 obtains an input 314 corresponding to the objective-effectuator interface request affordance 312e. In response to obtaining the input 314 in FIG. 3G, the first electronic device 201 changes the user interface 301 from the first unstructured video stream to an objective-effectuator interface in FIG. 3H. The objective-effectuator interface includes an objective-effectuator pane 316, a new container affordance 318 (as described above, with reference to the new container 270 FIG. 2L), and an emergent content container 320.

The objective-effectuator pane 316 includes the lion objective-effectuator 312a within a lion objective-effectuator container 330a, the dog objective-effectuator 312b within a dog objective-effectuator container 330b, and the cat objective-effectuator 312c within a cat objective-effectuator container 330c. Because the lion objective-effectuator 312a is currently selected (See the current selection indicator 312D in FIG. 3G), the lion objective-effectuator 312a is positioned at the top of the objective-effectuator pane 316 and enlarged with respect to the other animal objective-effectuators. As described above with reference to FIG. 2L, in some implementations, the lion objective-effectuator container 330*a* includes a lion manipulation affordance 332*a* to manipulate the lion objective-effectuator 312*a*, the dog objective-effectuator container 330*b* includes a dog manipulation affordance 332*b* to manipulate the dog objective-effectuator 312*b*, and the cat objective-effectuator container 330*c* includes a cat manipulation affordance 332*c* to manipulate the cat objective-effectuator 312*c*.

Figure 3I:
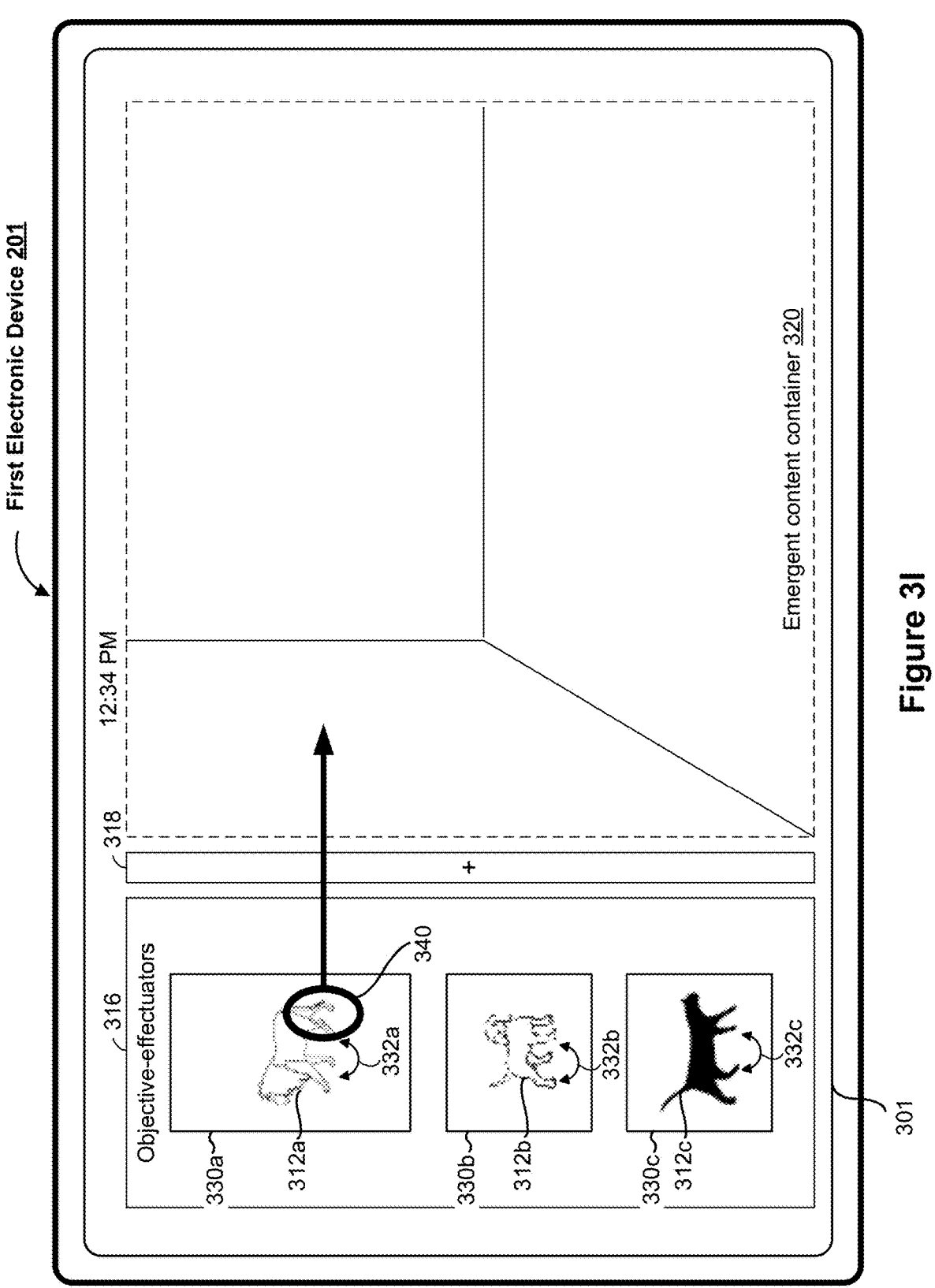

Referring to FIG. 3I, the first electronic device 201 detects an input 340 at a location corresponding to the lion objective-effectuator container 330*a*. In the example of FIG. 3I, the input 340 corresponds to a request to instantiate the lion objective-effectuator 312*a* in the emergent content container 320.

Figure 3J:
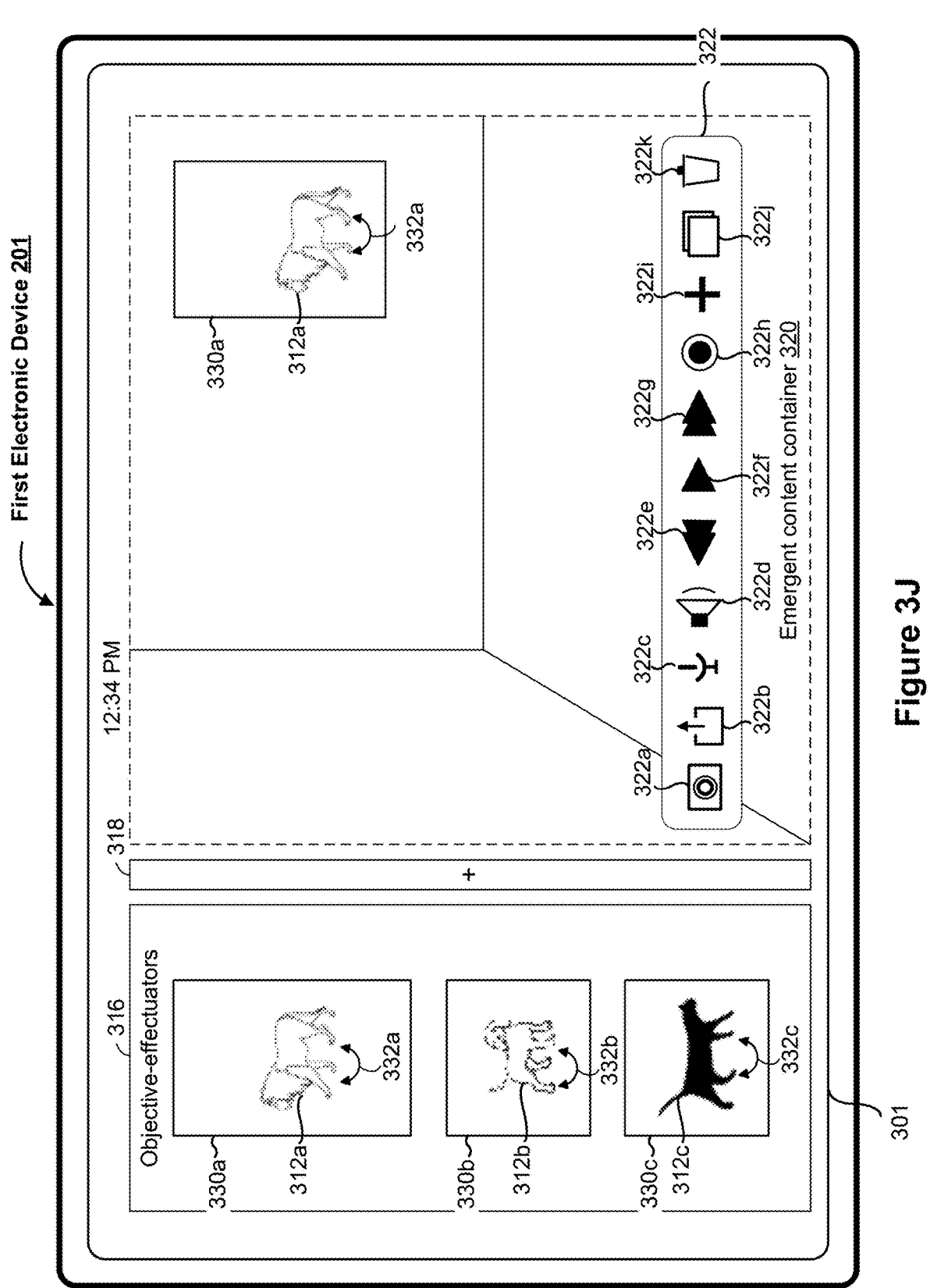

Referring to FIG. 3J, after detecting the input 340 shown in FIG. 3I, the first electronic device 201 instantiates the lion objective-effectuator 312*a* in the emergent content container 320. In the example of FIG. 3J, the emergent content container 320 includes the lion objective-effectuator container 330*a* because the emergent content container 320 is being setup. In other words, in the example of FIG. 3J, the emergent content container 320 is in an edit mode in which objective-effectuators are being added to the emergent content container 280. Additional details regarding instantiating an objective-effectuator are provided, above, with reference to FIGS. 2M and 2N. As illustrated in FIG. 3J, in various implementations, the emergent content container 320 includes various container affordances 322. Additional details regarding the container affordances 322 and its subcomponents are provided above, with reference to FIG. 2N.

Figure 4:
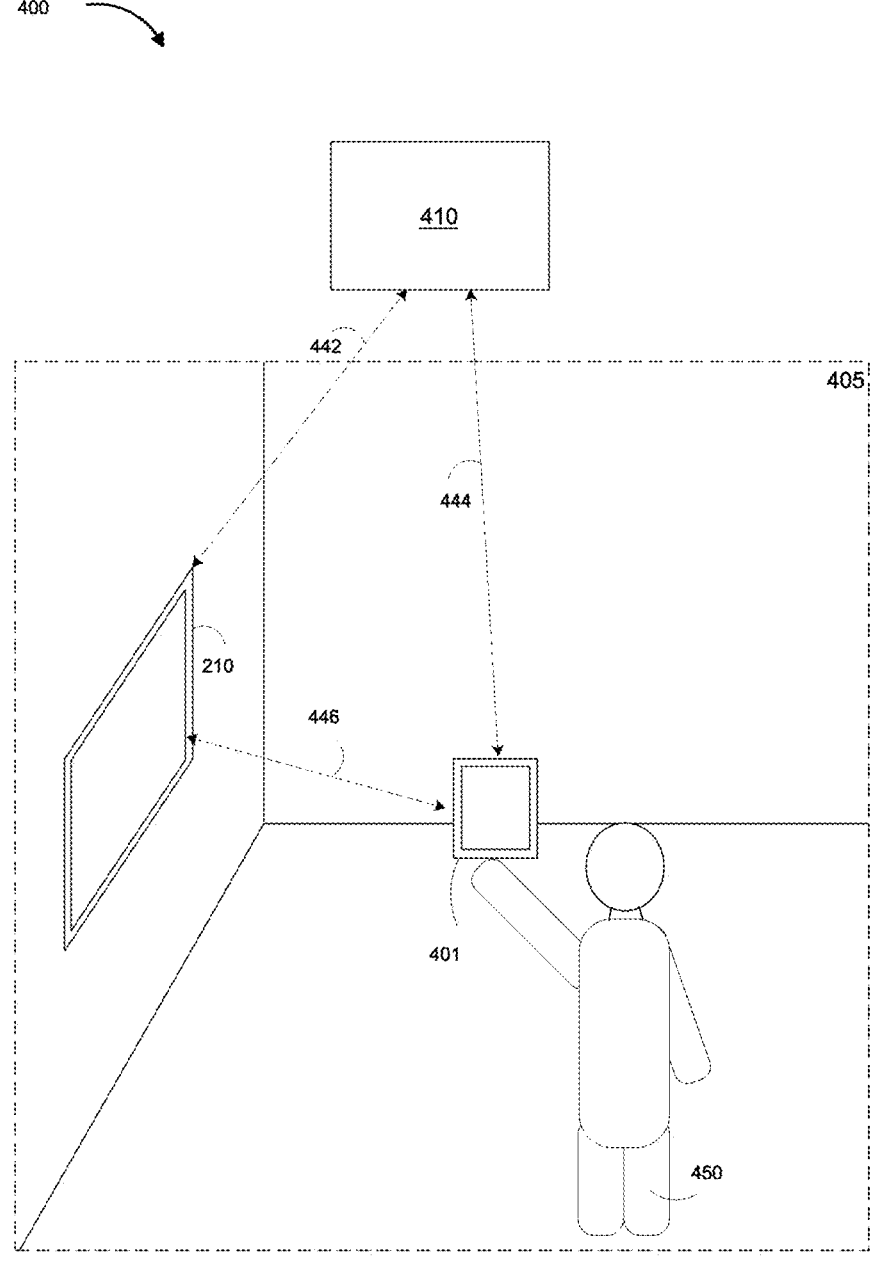
FIG. 4 is a block diagram of an example operating environment in accordance with some implementations.

FIG. 4 is a block diagram of an example operating environment 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 400 includes a controller 410, a first electronic device 401 (e.g., a head-mountable device (HMD)), and the second electronic device 210.

In some implementations, the controller 410 is configured to manage and coordinate a XR experience for the user. In some implementations, the controller 410 includes a suitable combination of software, firmware, and/or hardware. In some implementations, the controller 410 is a computing device that is local or remote relative to the physical setting 405. For example, the controller 410 is a local server located within the physical setting 405. In another example, the controller 410 is a remote server located outside of the physical setting 405 (e.g., a cloud server, central server, etc.).

In some implementations, the controller 410 is communicatively coupled with the first electronic device 201 via one or more wired or wireless communication channels 444 (e.g., BLUETOOTH, IEEE 802.11x, IEEE 802.16x, IEEE 802.3x, etc.). In some implementations, the controller 410 is communicatively coupled with the second electronic device 210 via one or more wired or wireless communication channels 442 (e.g., BLUETOOTH, IEEE 802.11x, IEEE 802.16x, IEEE 802.3x, etc.). In some implementations, the first electronic device 401 is communicatively coupled with the second electronic device 210 via one or more wired or wireless communication channels 446 (e.g., BLUETOOTH, IEEE 802.11x, IEEE 802.16x, IEEE 802.3x, etc.).

Referring to FIG. 4, the first electronic device 401 presents (e.g., displays) a XR environment according to various implementations. In some implementations, the first electronic device 401 includes an integrated display (e.g., a built-in display) that displays the XR environment. In some implementations, the first electronic device 401 includes a head-mountable enclosure. In various implementations, the head-mountable enclosure includes an attachment region to which another device with a display can be attached. For example, in some implementations, the first electronic device 201 can be attached to the head-mountable enclosure. In various implementations, the head-mountable enclosure is shaped to form a receptacle for receiving another device that includes a display (e.g., the first electronic device 201). For example, in some implementations, the first electronic device 201 slides/snaps into or otherwise attaches to the head-mountable enclosure. In some implementations, the display of the device attached to the head-mountable enclosure presents (e.g., displays) the XR environment. In various implementations, examples of the first electronic device 201 include smartphones, tablets, media players, laptops, etc.

In various implementations, the first electronic device 401 is configured to present a XR experience to the user 450 based on eye tracking data indicative of a gaze location of the user 450. For example, in some implementations, first electronic device 401 includes one or more eye tracking sensors (e.g., the eye tracking sensor(s) 164 in FIG. 1) that obtain eye tracking data. As another example, in some implementations, the first electronic device 201 slides into or otherwise attaches to a head-mountable enclosure, and obtains, from the one or more eye tracking sensors (e.g., the eye tracking sensor(s) 164 in FIG. 1), the eye tracking data. In various implementations, the first electronic device 201 is configured to present a XR experience to the user 450 independent of eye tracking data. In some implementations, the functionalities of the controller 410 and/or the second electronic device 210 are provided by and/or combined with the HMD 401.

According to some implementations, the first electronic device 401 presents a XR experience to the user 450 while the user 450 is virtually and/or physically present within a physical setting 405 that includes one or more physical objects, such as the table 230 in FIG. 2A. In some implementations, while presenting an augmented reality (AR) experience, the first electronic device 401 is configured to present AR content and to enable optical see-through of the physical setting 405. In some implementations, while presenting a virtual reality (VR) experience, the first electronic device 401 is configured to present VR content and to optionally enable video pass-through of the physical setting 405.

In some implementations, the second electronic device 210 is configured to present media content (e.g., video and/or audio content) to the user 450. In some implementations, the second electronic device 210 corresponds to a television or a computing device such as a desktop computer, kiosk, laptop computer, tablet, mobile phone, wearable computing device, or the like. In some implementations, the second electronic device 210 includes a suitable combination of software, firmware, and/or hardware.

Figure 5:
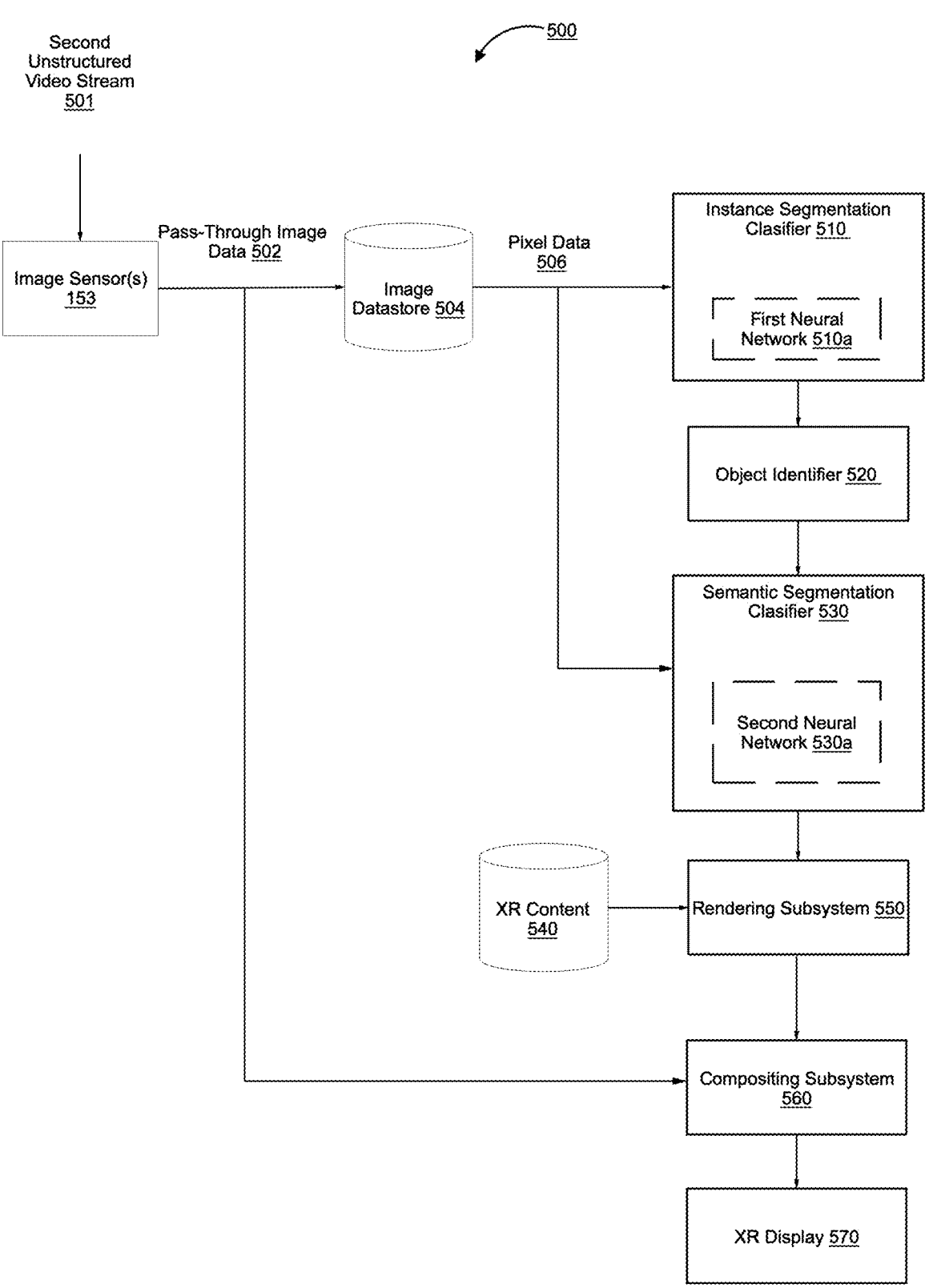
FIG. 5 is an example data flow diagram of a first electronic device according to some implementations.

FIG. 5 is an example data flow diagram 500 of a first electronic device (e.g., the first electronic device 201 in FIGS. 2A-2N and/or FIGS. 3A-3J, such as a tablet, HMD, head-mountable enclosure, mobile device, etc.) according to some implementations. The data flow diagram 500 includes various components and/or subsystems that facilities seman-
tic identification of one or more objects within a first
unstructured video stream. The first unstructured video
stream provides pixel values for a plurality of pixels. In
some implementations, the first unstructured video stream
corresponds to image or video data, such as a series of still
images.

In some implementations, the first electronic device
obtains the first unstructured video stream by utilizing the
image sensor(s) 143 to obtain physical environment infor-
mation including a second unstructured video stream 501
being displayed on a secondary display of a second elec-
tronic device. For example, with reference to FIG. 2A, the
first electronic device 201 obtains information associated
with the physical environment 200 that includes a wall 220,
a second unstructured video stream being displayed on a
second electronic device 210 (e.g., a television), and a table
230. In some implementations, the image sensor(s) 143
convert the physical environment information into pass-
through image data 502. In some implementations, the
pass-through image data 502 is stored in an image datastore
504 (e.g., a non-transitory memory). In some implementa-
tions, the instance segmentation classifier 510 and a com-
positing subsystem 560 each obtains the pass-through image
data 502. In some implementations, the pass-through image
data 502 provided to the instance segmentation classifier 510
corresponds to pixel data 506, including a plurality of pixels
corresponding to a plurality of pixel values.

In some implementations, the data flow diagram 500
includes obtaining the first unstructured video stream with-
out utilizing the image sensor(s) 143. For example, in some
implementations, the first electronic device obtains the first
unstructured video stream from the image datastore 504 that
corresponds to a local non-transitory memory (e.g., RAM),
such as playing a video file stored on the desktop of a
machine of a user. As another example, in some implemen-
tations, the first electronic device obtains a first unstructured
video stream from a remote location, such as streaming
content from a content delivery network (CDN), and pro-
vides the first unstructured video stream as the pixel data
506.

In some implementations, the data flow diagram 500
includes an instance segmentation classifier 510. The
instance segmentation classifier 510 generates respective
pixel characterization vectors for a portion of the plurality of
pixels provided by the first unstructured video stream.
Generating each of the respective pixel characterization
vectors includes determining a respective instance label
value. An instance label value provides an indication of how
many separate objects are in one or more images, but does
not convey any meaning or understanding with respect to the
objects. For example, three instance label values correspond
to "first object", "second object", and "third object", and are
associated with a dog, a chair, and a lamp, respectively.
Accordingly, an instance label does not provide a semantic
characterization of image data. As one example, with refer-
ence to FIG. 2B, the first electronic device 201 generates an
instance label value of "0" for pixels corresponding to the
dog 240, an instance label value of "1" for pixels corre-
sponding to the Sun 242, and an instance label value of "2"
for pixels corresponding to the tree 244. As another
example, with reference to FIG. 6, the pixel characterization
vectors 710-1 . . . 710-M include respective corresponding
instance label values 730a-1 . . . 730a-M. In some imple-
mentations, the instance segmentation classifier 510
includes a first neural network 510a that facilitates gener-
ating the respective pixel characterization vectors. In some implementations, the first neural network 510a in FIG. 5
corresponds to the neural network 600 in FIG. 6. The
instance segmentation classifier 510 provides the respective
pixel characterization vectors including the instance label
values to an object identifier 520.

In some implementations, the object identifier 520 iden-
tifies a first object within the portion of the plurality of pixels
(e.g., within the pixel data 506) associated with a first
instance label value. In some implementations, the object
identifier 520 identifies the first object in accordance with a
determination that pixel characterization vectors for the first
object satisfy an object confidence threshold. For example,
in some implementations, the object confidence threshold is
satisfied when a sufficient number of pixels in a sufficiently
small area are associated with respective pixel characteriza-
tion vectors that each include a common instance label value
(e.g., indicate the same object). In some implementations,
the object identifier 520 identifies objects on a pixel-by-pixel
basis. In other words, the object identifier 520 assigns to
each pixel the label values included within the correspond-
ing pixel characterization vector.

In some implementations, the object identifier 520 pro-
vides the identified first object and the respective pixel
characterization vectors to a semantic segmentation classi-
fier 530. Based on the pixel data 506, the semantic segmen-
tation classifier 430 generates respective semantic label
values corresponding to pixels associated with the first
object. The semantic segmentation classifier 530 adds
respective semantic label values to pixel characterization
vectors associated with the first object. Unlike an instance
label value, a semantic label value provides a semantic
characterization, or meaning/understanding, to pixels within
the pixel data 506. In some implementations, the semantic
segmentation classifier 530 includes a second neural net-
work 530a that facilitates generating the generating respec-
tive semantic label values. In some implementations, the
second neural network 530a in FIG. 5 corresponds to the
neural network 600 in FIG. 6.

As one example, with reference to FIGS. 2A-2N, the first
electronic device 201 generates a semantic label value of
"golden retriever dog" for pixels corresponding to the dog
240 and generates textual XR content 248 corresponding to
the semantic label value. In some implementations, the first
electronic device stores the XR content in a XR content
datastore, such as the XR content datastore 540 in FIG. 5.
Continuing with the previous example, the first electronic
device 201 renders the textual XR content 248 (e.g., via the
rendering subsystem 550 in FIG. 5) and composites the
rendered textual XR content with the pass-through image
data (e.g., via the compositing subsystem 560 in FIG. 5).
Continuing with this example, the first electronic device 201
displays (e.g., via the XR display 570 in FIG. 5) the
composited textual XR content and the pass-through image
data in FIG. 2F.

Figure 6:
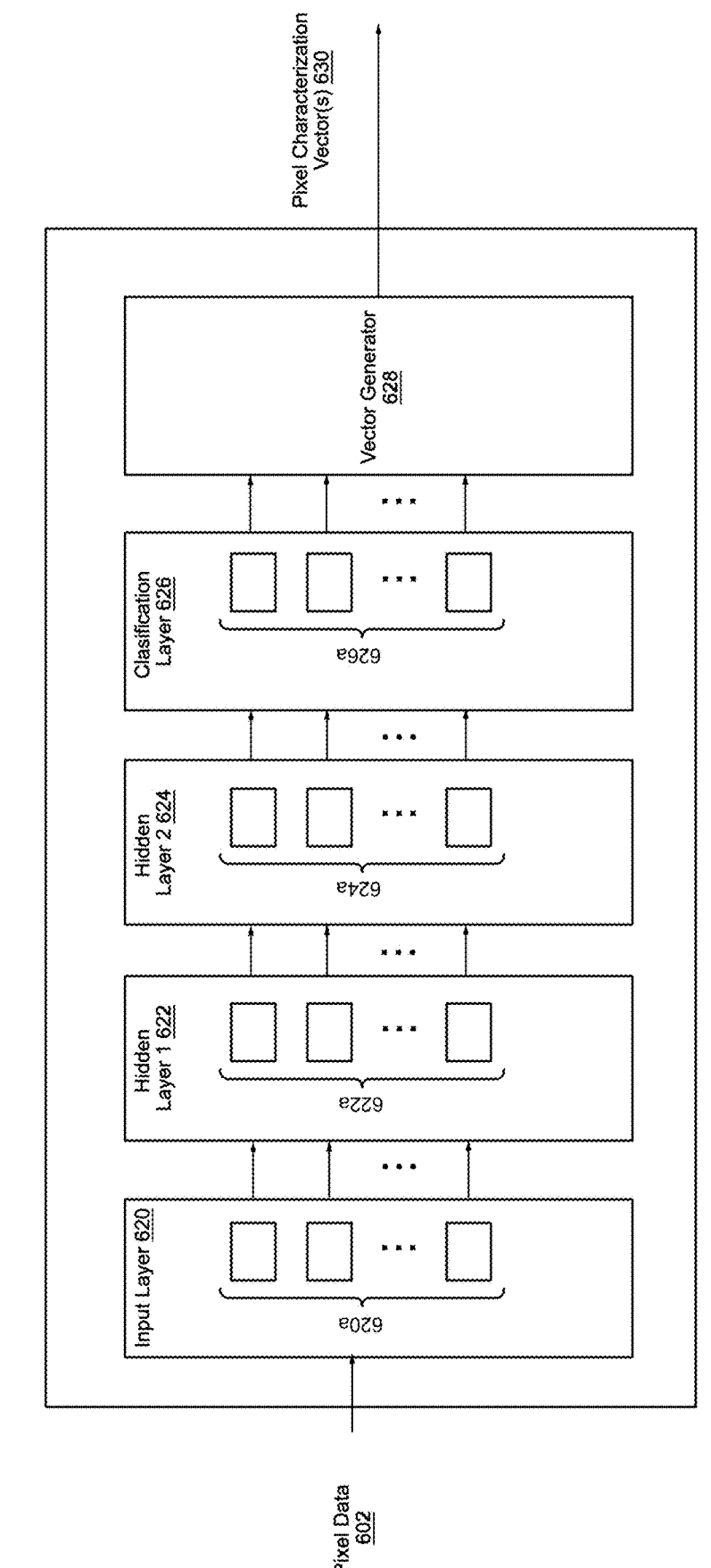
FIG. 6 is an example neural network according to some implementations.

FIG. 6 is an example neural network 600 according to
some implementations. In the example of FIG. 6, the neural
network 600 includes an input layer 620, a first hidden layer
622, a second hidden layer 624, a classification layer 626,
and a vector generator 628. While the neural network 600
includes two hidden layers as an example, those of ordinary
skill in the art will appreciate from the present disclosure
that one or more additional hidden layers are also present in
various implementations. Adding additional hidden layers
adds to the computational complexity and memory
demands, but may improve performance for some applica-
tions.

In various implementations, the input layer 620 is coupled (e.g., configured) to receive various inputs. For example, in some implementations, the input layer 620 receives pixel data 602 (e.g., the pixel data 506 in FIG. 5) from the image sensor(s) 143. In various implementations, the input layer 620 includes a number of LSTM logic units 620a, which are also referred to as model(s) of neurons by those of ordinary skill in the art. In some such implementations, an input matrix from the features to the LSTM logic units 620a include rectangular matrices. The size of this matrix is a function of the number of features included in the feature stream.

In some implementations, the first hidden layer 622 includes a number of LSTM logic units 622a. In some implementations, the number of LSTM logic units 622a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 6, the first hidden layer 622 receives its inputs from the input layer 620.

In some implementations, the second hidden layer 624 includes a number of LSTM logic units 624a. In some implementations, the number of LSTM logic units 624a is the same as or similar to the number of LSTM logic units 620a in the input layer 620 or the number of LSTM logic units 622a in the first hidden layer 622. As illustrated in the example of FIG. 6, the second hidden layer 624 receives its inputs from the first hidden layer 622. Additionally or alternatively, in some implementations, the second hidden layer 624 receives its inputs from the input layer 620.

In some implementations, the classification layer 626 includes a number of LSTM logic units 626a. In some implementations, the number of LSTM logic units 626a is the same as or similar to the number of LSTM logic units 620a in the input layer 620, the number of LSTM logic units 622a in the first hidden layer 622, or the number of LSTM logic units 624a in the second hidden layer 624. In some implementations, the classification layer 626 includes an implementation of a multinomial logistic function (e.g., a soft-max function) that produces a number of outputs.

In some implementations, the vector generator 628 generates pixel characterization vector(s), such as the pixel characterization vectors 710-1 . . . 710-M, as illustrated in FIG. 7. In some implementations, the vector generator 628 generates the pixel characterization vector(s) by selecting the top N action candidates provided by the classification layer 626. In some implementations, the top N action candidates are most likely to accurately characterize a corresponding pixel in the pixel data 602. In some implementations, the vector generator 628 generates a set of probability or confidence values for corresponding label values within a particular vector.

FIG. 7 is a representation of pixel characterization vectors 700 according to some implementations. The representation of pixel characterization vectors 700 includes an M number of pixel characterization vectors 710-1 . . . 710-M. As is illustrated in FIG. 7, each of the pixel characterization vectors 710-1 . . . 710-M includes a pixel identifier (e.g., first pixel 720-1), a corresponding instance label value, and corresponding semantic label values. Each pixel characterization vector is associated with a particular pixel of pixel data or multiple pixels of the pixel data.

A particular instance label value is used to differentiate one object from another object. Although each of the pixel characterization vectors 710-1 . . . 710-M includes one instance label value, in some implementations, a portion of the pixel characterization vectors 710-1 . . . 710-M each includes multiple instance label values. For example, in some implementations, particular pixel characterization vector associated with a pixel of a corner of a table has a first instance label value of "0" for table and a second instance label value of "1" for corner. In some implementations, an instance segmentation classifier, such as the instance segmentation classifier 510 in FIG. 5, generates instance label values.

On the other hand, a particular semantic label value provides an understanding or meaning associated with a corresponding pixel within pixel data. For example, the second pixel characterization vector 710-2 may be associated with a pixel of the dog 240 in FIG. 2A and includes a first semantic label value 730b-2 of "dog", a second semantic label value 730c-2 of "brown", and a third semantic label value 730d-2 of "golden retriever". In some implementations, a semantic segmentation classifier (e.g., the semantic segmentation classifier 530 in FIG. 5) generates semantic label values and appends the semantic label values to respective pixel characterization vectors.

Figure 8:
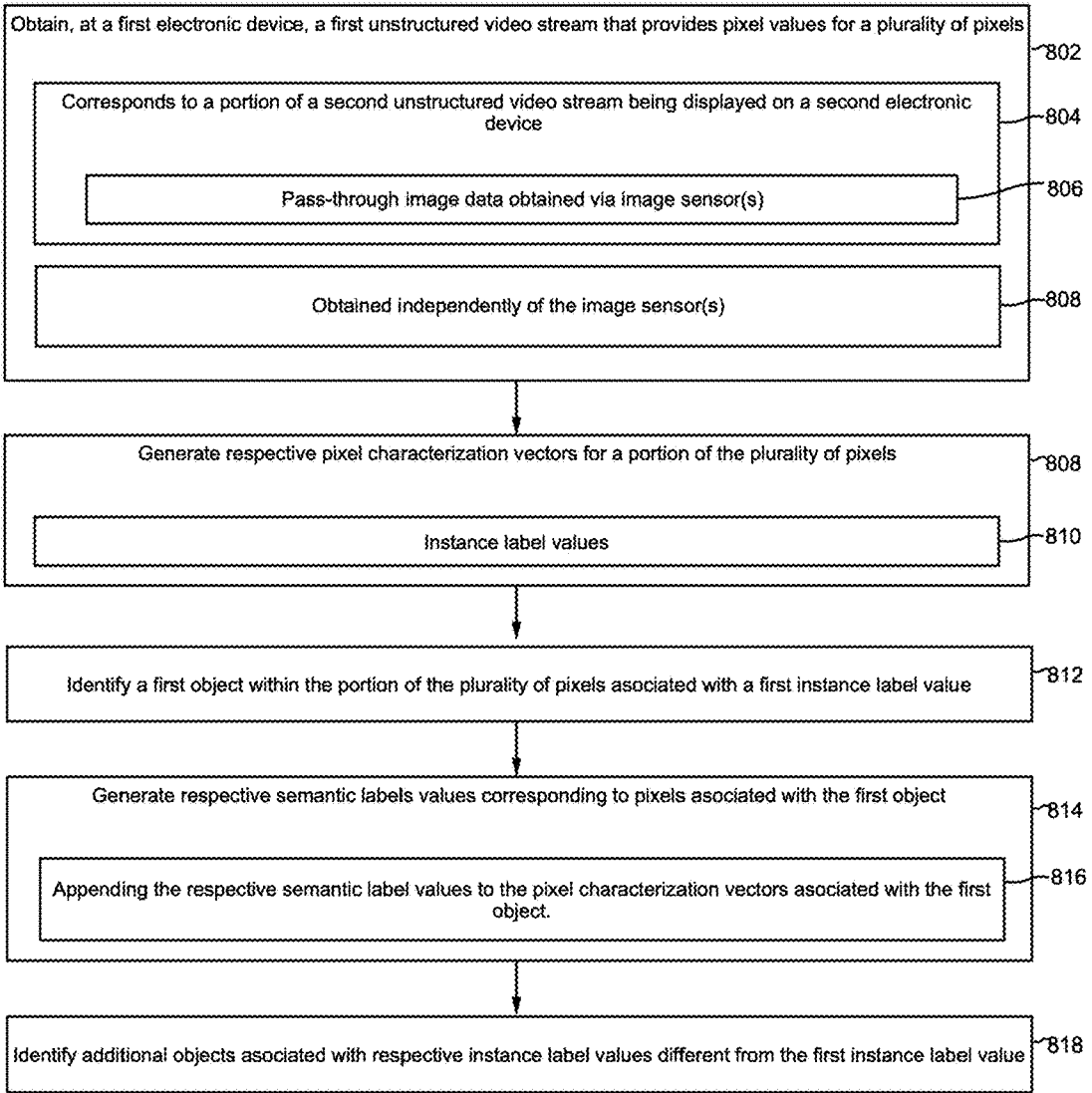
FIG. 8 is a flow diagram of a method of semantically identifying object(s) within a first unstructured video stream according to some implementations.

FIG. 8 is a flow diagram of a method 800 of semantically identifying object(s) within a first unstructured video stream according to some implementations. In various implementations, the method 800 or portions thereof are performed by a first electronic device (e.g., the first electronic device 201 in FIGS. 2A-2N and/or FIGS. 3A-3J). In various implementations, the method 800 or portions thereof are performed by the data flow diagram 500 in FIG. 5 and/or the neural network 600 in FIG. 6. In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, the method 800 includes identifying one or more objects within the first unstructured video stream by utilizing instance segmentation and optionally semantic segmentation.

As represented by block 802, the method 800 includes obtaining, at a first electronic device, a first unstructured video stream that provides pixel values for a plurality of pixels. In some implementations, the pixel values are time varying based on different frames.

As represented by block 804, in some implementations, the first unstructured video stream corresponds to a portion of a second unstructured video stream being displayed on a secondary display of a second electronic device that is different from the first electronic device, as is illustrated in FIGS. 2A-2N. In some implementations, the first unstructured video stream includes the entirety of the second unstructured video stream, such as when an image sensor of the first electronic device is oriented towards the second electronic device so as to capture the entire display of the second electronic device. In some implementations, the first unstructured video stream includes the entirety of the second unstructured video stream, such as when an image sensor of the first electronic device is oriented towards the second electronic device so as to capture the entire display of the second electronic device. In some implementations, the first unstructured video stream includes less than the entirety of the second unstructured video stream, such as when an image sensor of the first electronic device is oriented towards the second electronic device so as to capture less than the entire display of the second electronic device. In some implementations, the first unstructured video stream corresponds to a sequence or series of unstructured images. In some implementations, the first unstructured video stream corresponds to video data (e.g., .mpeg, .avi, etc.) and/or image data (e.g., .jpg, .bmp, etc.). As represented by block 806, in some implementations, the method 800 includes obtaining, via one or more image sensors, pass-through image data including the portion of the second unstructured video stream. For example, with reference to FIG. 2A, a rear-facing camera of the first electronic device 201 obtains pass-through image data associated with the physical environment 200 that includes the second unstructured video stream 211 being displayed on the second electronic device 210.

As represented by block 808, in some implementations, the method 800 includes obtaining the first unstructured video stream independently of the image sensors of the first electronic device. For example, in some implementations, the first electronic device obtains the first unstructured video stream from local non-transitory memory (e.g., RAM, hard drive, flash memory) integrated within the first electronic device. As another example, in some implementations, a communication interface of the first electronic device obtains the first unstructured video stream from a remote location, such as a network interface (e.g., network interface card (NIC)) obtaining a video file from the Internet.

As represented by block 808, the method 800 includes generating respective pixel characterization vectors for a portion of the plurality of pixels. As represented by block 810, generating each of the respective pixel characterization vectors includes determining a respective instance label value. The instance label value provides an indication of how many separate objects are in image(s) or a video stream. The instance label does not convey any meaning other than to indicate that one object is separate from another object.

In some implementations, an instance segmentation classifier (e.g., the instance segmentation classifier 510 in FIG. 5) generates the respective pixel characterization vectors. In some implementations, the instance segmentation classifier utilizes a neural network (e.g., the first neural network 510a in FIG. 5 and/or the neural network 600 in FIG. 6) to generate the respective pixel characterization vectors. In some implementations including a head-mountable device (HMD) displaying the first unstructured video stream, the neural network is included in (e.g., integrated within) a base unit separate from the HMD in order to prevent the HMD from overheating due to processing demands.

As represented by block 812, the method 800 includes identifying a first object within the portion of the plurality of pixels associated with a first instance label value. The first object may correspond to one or more of a feature, person(s), animal, etc. In some implementations, the first object corresponds to pixels that are adjacent to each other or contiguously associated with each other. For example, with reference to FIG. 2B, a pixel corresponding to the right eye of the dog 240 is adjacent to a pixel corresponding to the left eye of the dog 240. In some implementations, an object identifier (e.g., the object identifier 620 in FIG. 5) identifies the first object.

As represented by block 814, the method 800 includes generating respective semantic label values corresponding to pixels associated with the first object. The respective semantic label values are added to pixel characterization vectors associated with the first object. As represented by block 816, in some implementations, the method 800 includes appending the respective semantic label values to the pixel characterization vectors associated with the first object. The semantic label values provide a semantic indication (e.g., understanding, meaning) with respect the first object. For example, with reference to FIGS. 2C and 2D, the first electronic device 201 generates one or more semantic label values including "Golden Retriever Dog" corresponding to the dog 240 and displays a corresponding semantic indication 240b. In some implementations, a semantic segmentation classifier (e.g., the semantic segmentation classifier 530) generates the respective semantic label values. For example, in some implementations, the semantic segmentation classifier utilizes a neural network (e.g., the second neural network 530a in FIG. 5 and/or the neural network 600 in FIG. 6) to generate the respective semantic label values. In some implementations including a head-mountable device (HMD) displaying the first unstructured video stream, the neural network is included in a base unit separate from the HMD in order to prevent the HMD from overheating due to processing demands.

As represented by block 818, in some implementations, the method 800 includes identifying additional objects within the portion of the plurality of pixels. In some implementations, the method 800 includes identifying a second object within the portion of the plurality of pixels associated with a second instance label value that is different from the first instance label value, and generating additional semantic label values corresponding to pixels associated with the second object in the first unstructured video stream. The additional semantic label values are added to the pixel characterization vectors associated with the second object. For example, with reference to FIG. 2B, the first electronic device 201 identifies a first object corresponding to the dog 240 and identifies a second object corresponding to the tree 244.

Figure 9:
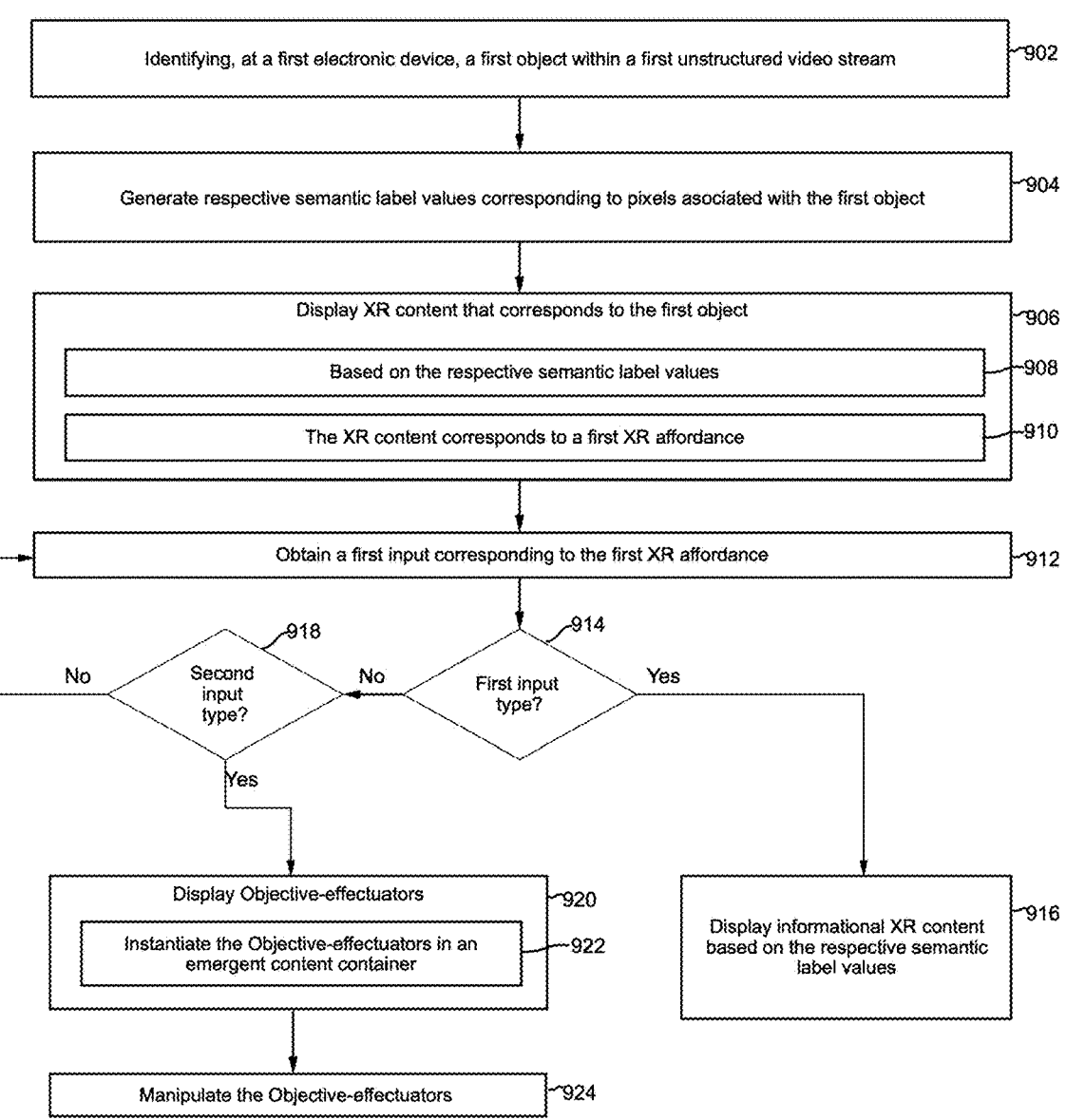
FIG. 9 is a flow diagram of a method of providing a XR experience with respect to semantically-identified object(s) within a first unstructured video stream according to some implementations.

FIG. 9 is flow diagram of a method 900 of providing a XR experience with respect to semantically-identified object(s) within a first unstructured video stream according to some implementations. In various implementations, the method 900 or portions thereof are performed by a first electronic device (e.g., the first electronic device 201 in FIGS. 2A-2N and/or FIGS. 3A-3J). In various implementations, the method 900 or portions thereof are performed by the data flow diagram 500 in FIG. 5 and/or the neural network 600 in FIG. 6. In some implementations, the method 900 is performed by processing logic, including hardware, firmware, software, or a combination thereof. In some implementations, the method 900 is performed by a processor executing code stored in a non-transitory computer-readable medium (e.g., a memory). Briefly, the method 900 includes providing the XR experience with respect to semantically-identified object(s) within the first unstructured video stream.

As represented by block 902, the method 900 includes identifying, at a first electronic device, a first object within a first unstructured video stream by utilizing instance label values, such as is described with respect to FIG. 8. As represented by block 904, the method 900 includes generating respective semantic label values corresponding to pixels associated with the first object.

As represented by block 906, in some implementations, the method 900 includes displaying, via a primary display of the first electronic device, extended reality (XR) content that corresponds to the first object in the first unstructured video stream. In some implementations, the XR content is overlaid on the first unstructured video stream. In some implementations, the XR content is overlaid proximate or adjacent to the first object within the first unstructured video stream.

As represented by block 908, in some implementations, the XR content is based on the respective semantic label values corresponding to pixels associated with the first object. For example, with reference to FIG. 2D, the first electronic device 201 displays textual XR content "Golden Retriever Dog" 240b near a corresponding dog 240 based on one or more determined semantic label values corresponding to the dog 240.

As represented by block 910, in some implementations, the XR content corresponds to a first XR affordance. The first XR affordance is input-selectable, and based on selection of the first XR affordance the first electronic device may affect the XR experience associated with one or more identified objects within the first unstructured video stream. For example, with reference to FIG. 3B, the first electronic device 201 displays an object identifier 302a corresponding to the identified lion 302 within the first unstructured video stream within the user interface 301.

As represented by block 912, in some implementations, the method 900 includes obtaining, from one or more input devices, a first input corresponding to the first XR affordance. In some implementations, the method 900 includes determining an input type of the first input. As represented by block 914, in response to determining that the first input corresponds to a first input type, the method 900 continues to a portion of the method 900 represented by block 916 ("Yes" path from block 914). On the other hand, as represented by block 918, in response to determining that the first input corresponds to a second input type different from the first input type, the method 900 continues to a portion of the method 900 represented by block 920. In some implementations, in response to determining the first input corresponds to neither the first input type nor the second input type, the method 900 reverts back to the portion of the method 900 represented by block 912 ("No" path from block 918) in order to obtain additional input(s).

As represented by block 916, in some implementations, in response to determining that the first input corresponds to the first input type (e.g., single-tap input), the method 900 includes displaying, via the primary display, informational XR content corresponding to the first object. The informational XR content is based on the respective semantic label values corresponding to pixels associated with the first object. In some implementations, displaying the informational XR content includes ceasing to display the first XR affordance. In some implementations, the informational XR content is based on a corresponding semantic label value. For example, with reference to FIG. 3D, the informational XR content 308 is included within a corresponding pixel characterization vector, which includes the value "lion" as a particular semantic label value. In some implementations, the informational XR content is based on a particular semantic label value within a corresponding pixel characterization vector but is not the semantic label value itself. For example, with reference to FIG. 3D, based on the semantic label value of "lion," the first electronic device 201 obtains and displays additional informational XR content 308 (e.g., "Average lifespan: 10-14 years"), such as by obtaining Internet search results on the semantic label value of "lion."

On the other hand, as represented by block 920, in some implementations, in response to determining that the first input corresponds to the second input type (e.g., a force touch input or long touch input) different from the first input type, the method 900 includes displaying, via the primary display, an objective-effectuator based on the respective semantic label values corresponding to pixels associated with the first object. The objective-effectuator is characterized by a set of predefined objectives and a set of visual rendering attributes. In some implementations, the objective-effectuator is displayed overlaid on the first unstructured video stream. In some implementations, displaying the objective-effectuator includes ceasing to display the first XR affordance. For example, in response to detecting the second input 250 in FIG. 2G corresponding to a second input type, the first electronic device 201 displays a catalogue of animal objective-effectuators 252 that includes various objective-effectuators in FIG. 2H.

As represented by block 922, in some implementations, displaying the objective-effectuator includes instantiating the objective-effectuator in an emergent content container characterized by contextual information. The emergent content container enables the objective-effectuator to perform a set of actions that satisfy the set of predefined objectives. For example, in response to detecting the input 340 in FIG. 3I that corresponds to requesting to instantiate the lion objective-effectuator container 330a, the first electronic device 201 instantiates the lion objective-effectuator 312a in the emergent content container 320 in FIG. 3J.

As represented by block 924, in some implementations, the method 900 includes modifying the objective-effectuator. For example, in some implementations, modifying the objective-effectuator includes displaying, via the primary display, a second XR affordance in association with the emergent content container, and, in response to detecting, via the one or more input devices, a second input corresponding to the second XR affordance, modifying the objective-effectuator. The second XR affordance controls an operation of the emergent content container. As another example, in some implementations, modifying the objective-effectuator includes generating a sequence of actions of the set of actions based on the contextual information and a particular objective of the set of predefined objectives, and modifying, via the primary display, the objective-effectuator based on the sequence of actions. In some implementations, a neural network (e.g., the neural network 600 in FIG. 5) generates the sequence of actions. For example, with reference to FIGS. 2N and 3J, the respective emergent content containers includes container affordances 282 and 322 enable modification of the corresponding instantiated objective-effectuators 252c and 312a.

FIG. 10 is a block diagram 1000 of an example of a first electronic device according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the first electronic device includes one or more processing units (CPUs) 1001, a network interface 1002, one or more input/output (I/O) devices 1003, a programming interface 1004, a memory 1006, and one or more communication buses 1005 for interconnecting these and various other components. In some implementations, the one or more communication buses 1005 include circuitry that interconnects and controls communications between system components.

The memory 1006 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid state storage devices. The memory 1006 optionally includes one or more storage devices remotely located from the one or more CPU(s) 1001. The memory 1006 comprises a non-transitory computer readable storage medium.

In some implementations, the memory 1006 or the non-transitory computer readable storage medium of the memory 1006 stores the following programs, modules and data structures, or a subset thereof including an optional operating system 1007, an instance segmentation classifier 1008 (e.g., the instance segmentation classifier 510 in FIG. 5) that optionally includes a first neural network 1010 (e.g., the first neural network 510a in FIG. 5), an object identifier 1012 (e.g., the object identifier 520 in FIG. 5), a semantic segmentation classifier 1014 (e.g., the semantic segmentation classifier 530 in FIG. 5) that optionally includes a second neural network 1016 (e.g., the second neural network 530a in FIG. 5), a rendering subsystem 1018 (e.g., the rendering subsystem 550 in FIG. 5), and a compositing subsystem 1020 (e.g., the compositing subsystem 560 in FIG. 5).

In some implementations, the instance segmentation classifier 1008 generates respective pixel characterization vectors for a portion of a plurality of pixels provided by a first unstructured video stream. Generating each of the respective pixel characterization vectors includes determining a respective instance label value. In some implementations, the instance segmentation classifier 1008 utilizes the first neural network 1010 in generating the respective pixel characterization vectors.

In some implementations, the object identifier 1012 identifies a first object within the portion of the plurality of pixels associated with a first instance label value.

In some implementations, the semantic segmentation classifier 1014 generates respective semantic label values corresponding to pixels associated with the first object. The respective semantic label values are added to pixel characterization vectors associated with the first object. In some implementations, the semantic segmentation classifier 1014 utilizes the second neural network 1016 in generating the semantic label values. In some implementations, the semantic segmentation classifier 1014 appends the respective semantic label values to the pixel characterization vectors associated with the first object.

In some implementations, the rendering subsystem 1018 renders XR content that is overlaid on the first untrusted video stream. In some implementations, the compositing subsystem 1020 composites the rendered XR content with pass-through image data obtained via an image sensor of the first electronic device.

Moreover, FIG. 10 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at a first electronic device including one or more processors, one or more image sensors, and a non-transitory memory:

obtaining, using the one or more image sensors, a first unstructured video stream that provides pixel values for a plurality of pixels for rendering in an extended reality (XR) environment, wherein the one or more image sensors capture pass-through image data including a portion of a second unstructured video stream being displayed on a secondary display of a second electronic device that is different from the first electronic device;

generating respective pixel characterization vectors for a portion of the plurality of pixels, wherein each of the respective pixel characterization vectors is associated with a corresponding pixel in the portion of the plurality of pixels, wherein generating each of the respective pixel characterization vectors includes determining a respective instance label value and adding the respective instance label value to each of the respective pixel characterization vectors indicating separate objects in one or more images of the first unstructured video stream;

identifying a first object within the portion of the plurality of pixels based on satisfying an object confidence threshold that indicates that pixels are associated with pixel characterization vectors that each include a first instance label value that is associated with an object represented in the portion of the plurality of pixels;

generating respective semantic label values corresponding to pixels associated with the first object, wherein the respective semantic label values are added to pixel characterization vectors associated with the first object and characterize the first object; and providing a first XR affordance corresponding to the identified first object to instantiate an objective-effectuator, wherein the objective-effectuator performing actions in the XR environment is characterized by the respective semantic label values.

2. The method of claim 1, further comprising appending the respective semantic label values to the pixel characterization vectors associated with the first object.

3. The method of claim 1, further comprising displaying, via a primary display of the first electronic device, extended reality (XR) content that corresponds to the first object in the first unstructured video stream, wherein the XR content is displayed overlaid on the pass-through image data that include the portion of the second unstructured video stream.

4. The method of claim 1, wherein the respective pixel characterization vectors are generated by an instance segmentation classifier.

5. The method of claim 1, further comprising:

identifying a second object within the portion of the plurality of pixels associated with a second instance label value that is different from the first instance label value; and generating additional semantic label values corresponding to pixels associated with the second object in the first unstructured video stream, wherein the additional semantic label values are added to the pixel characterization vectors associated with the second object.

6. The method of claim 1, wherein the first electronic device and the second electronic device are separate from each other.

7. The method of claim 3, wherein the XR content is based on the respective semantic label values corresponding to the pixels associated with the first object.

8. The method of claim 3, further comprising, in response to obtaining, from one or more input devices, a first input corresponding to the first XR affordance:

in accordance with a determination that the first input corresponds to a first input type, displaying, via the primary display, informational XR content corresponding to the first object, wherein the informational XR content is based on the respective semantic label values corresponding to the pixels associated with the first object; and in accordance with a determination that the first input corresponds to a second input type different from the first input type, displaying, via the primary display, the objective- effectuator based on the respective semantic label values corresponding to the pixels associated with the first object, wherein the objective-effectuator is characterized by a set of predefined objectives and a set of visual rendering attributes.

9. The method of claim 4, wherein the respective semantic label values are generated by a semantic segmentation classifier that is different from the instance segmentation classifier.

10. The method of claim 8, wherein displaying the objective-effectuator includes instantiating, the objective-effectuator in an emergent content container characterized by contextual information, wherein the emergent content container enables the objective-effectuator to perform a set of actions that satisfy the set of predefined objectives.

11. The method of claim 10, further comprising:

displaying, via the primary display, a second XR affordance in association with the emergent content container, wherein the second XR affordance controls an operation of the emergent content container; and in response to detecting, via the one or more input devices, a second input corresponding to the second XR affordance, modifying the objective-effectuator.

12. The method of claim 10, further comprising:

generating a sequence of actions of the set of actions based on the contextual information and a particular objective of the set of predefined objectives; and modifying, via the primary display, the objective-effectuator based on the sequence of actions.

13. A first electronic device comprising:

one or more processors;

one or more image sensors;

a non-transitory memory; and one or more programs, wherein the one or more programs are stored in the non-transitory memory and configured to be executed by the one or more processors, the one or more programs including instructions for:

obtaining, using the one or more image sensors, a first unstructured video stream that provides pixel values for a plurality of pixels for rendering in an extended reality (XR) environment, wherein the one or more image sensors capture pass-through image data including a portion of a second unstructured video stream being displayed on a secondary display of a second electronic device that is different from the first electronic device;

generating respective pixel characterization vectors for a portion of the plurality of pixels, wherein each of the respective pixel characterization vectors is associated with a corresponding pixel in the portion of the plurality of pixels, wherein generating each of the respective pixel characterization vectors includes determining a respective instance label value and adding the respective instance label value to each of the respective pixel characterization vectors indicating separate objects in one or more images of the first unstructured video stream;

identifying a first object within the portion of the plurality of pixels based on satisfying an object confidence threshold that indicates that pixels are associated with pixel characterization vectors that each include a first instance label value that is associated with an object represented in the portion of the plurality of pixels;

generating respective semantic label values corresponding to pixels associated with the first object, wherein the respective semantic label values are added to pixel characterization vectors associated with the first object and characterize the first object; and providing a first XR affordance corresponding to the identified first object to instantiate an objective-effectuator, wherein the objective-effectuator performing actions in the XR environment is characterized by the respective semantic label values.

14. The first electronic device of claim 13, wherein the first electronic device includes a primary display, and wherein the one or more programs include instructions for displaying, via the primary display, extended reality (XR) content that corresponds to the first object in the first unstructured video stream, wherein the XR content is displayed overlaid on the pass-through image data that include the portion of the second unstructured video stream.

15. The first electronic device of claim 14, wherein the XR content is based on the respective semantic label values corresponding to the pixels associated with the first object.

16. The first electronic device of claim 14, wherein the one or more programs include instructions for, in response to obtaining, from one or more input devices, a first input corresponding to the first XR affordance:

in accordance with a determination that the first input corresponds to a first input type, displaying, via the primary display, informational XR content corresponding to the first object, wherein the informational XR content is based on the respective semantic label values corresponding to the pixels associated with the first object; and in accordance with a determination that the first input corresponds to a second input type different from the first input type, displaying, via the primary display, the objective- effectuator based on the respective semantic label values corresponding to the pixels associated with the first object, wherein the objective-effectuator is characterized by a set of predefined objectives and a set of visual rendering attributes.

17. The first electronic device of claim 16, wherein displaying the objective- effectuator includes instantiating, the objective-effectuator in an emergent content container characterized by contextual information, wherein the emergent content container enables the objective-effectuator to perform a set of actions that satisfy the set of predefined objectives.

18. A non-transitory computer readable storage medium storing one or more programs, the one or more programs comprising instructions, which, when executed by a first electronic device including one or more processors and one or more image sensors, cause the first electronic device to:

obtain, using the one or more image sensors, a first unstructured video stream that provides pixel values for a plurality of pixels for rendering in an extended reality (XR) environment, wherein the one or more image sensors capture pass-through image data including a portion of a second unstructured video stream being displayed on a secondary display of a second electronic device that is different from the first electronic device;

generate respective pixel characterization vectors for a portion of the plurality of pixels, wherein each of the respective pixel characterization vectors is associated with a corresponding pixel in the portion of the plurality of pixels, wherein generating each of the respective pixel characterization vectors includes determining a respective instance label value and adding the respective instance label value to each of the respective pixel characterization vectors indicating separate objects in one or more images of the first unstructured video stream;

identifying a first object within the portion of the plurality of pixels based on satisfying an object confidence threshold that indicates that pixels are associated with pixel characterization vectors that each include a first instance label value that is associated with an object represented in the portion of the plurality of pixels;

generate respective semantic label values corresponding to pixels associated with the first object, wherein the respective semantic label values are added to pixel characterization vectors associated with the first object and characterize the first object; and provide a first XR affordance corresponding to the identified first object to instantiate an objective-effectuator, wherein the objective-effectuator performing actions in the XR environment is characterized by the respective semantic label values.

* * * * *